United States Patent [19]
Imai

[11] Patent Number: 5,296,889
[45] Date of Patent: Mar. 22, 1994

[54] CAMERA DRIVING CIRCUIT

[75] Inventor: Yuji Imai, Tokyo, Japan

[73] Assignee: Olympus Optical Co., Ltd., Tokyo, Japan

[21] Appl. No.: 879,160

[22] Filed: Apr. 30, 1992

Related U.S. Application Data

[63] Continuation of Ser. No. 662,491, Feb. 27, 1991, abandoned, which is a continuation of Ser. No. 393,900, Aug. 14, 1989, abandoned.

[30] Foreign Application Priority Data

Sep. 5, 1988 [JP] Japan .................... 63-221635

[51] Int. Cl.⁵ .............................. G03B 7/00
[52] U.S. Cl. .................... 354/412; 354/289.1
[58] Field of Search ........... 354/289.1, 289.11, 289.12, 354/412, 173.1, 173.11, 212–216

[56] References Cited

U.S. PATENT DOCUMENTS

| | | | |
|---|---|---|---|
| 4,772,908 | 9/1988 | Ishimura et al. | 354/400 |
| 4,841,327 | 6/1989 | Yamamoto et al. | 354/412 |
| 4,845,522 | 7/1989 | Kataoka | 354/412 |
| 4,970,538 | 11/1990 | Ichikawa et al. | 354/145.1 |

Primary Examiner—David M. Gray
Attorney, Agent, or Firm—Frishauf, Holtz, Goodman & Woodward

[57] ABSTRACT

Between a central processing unit for sequence control of a camera and a plurality of controlled systems is connected an interface serving as a predriver, which is formed of a monolithic integrated circuit. The controlled systems are transistors forming bridge circuits of drivers for controlling motors acting as driving sources of the camera. Between the central processing unit and the interface is a serial communication line system which comprises at least one serial data line and at least one serial clock line. The interface includes a serial-to-parallel conversion circuit for converting serial data transmitted over the serial data communication line system to parallel data, a latch circuit for latching the parallel data output from the serial-to-parallel conversion circuit and an output buffer circuit responsive to output signals of the latch circuit for providing drive signals to the controlled systems.

25 Claims, 24 Drawing Sheets

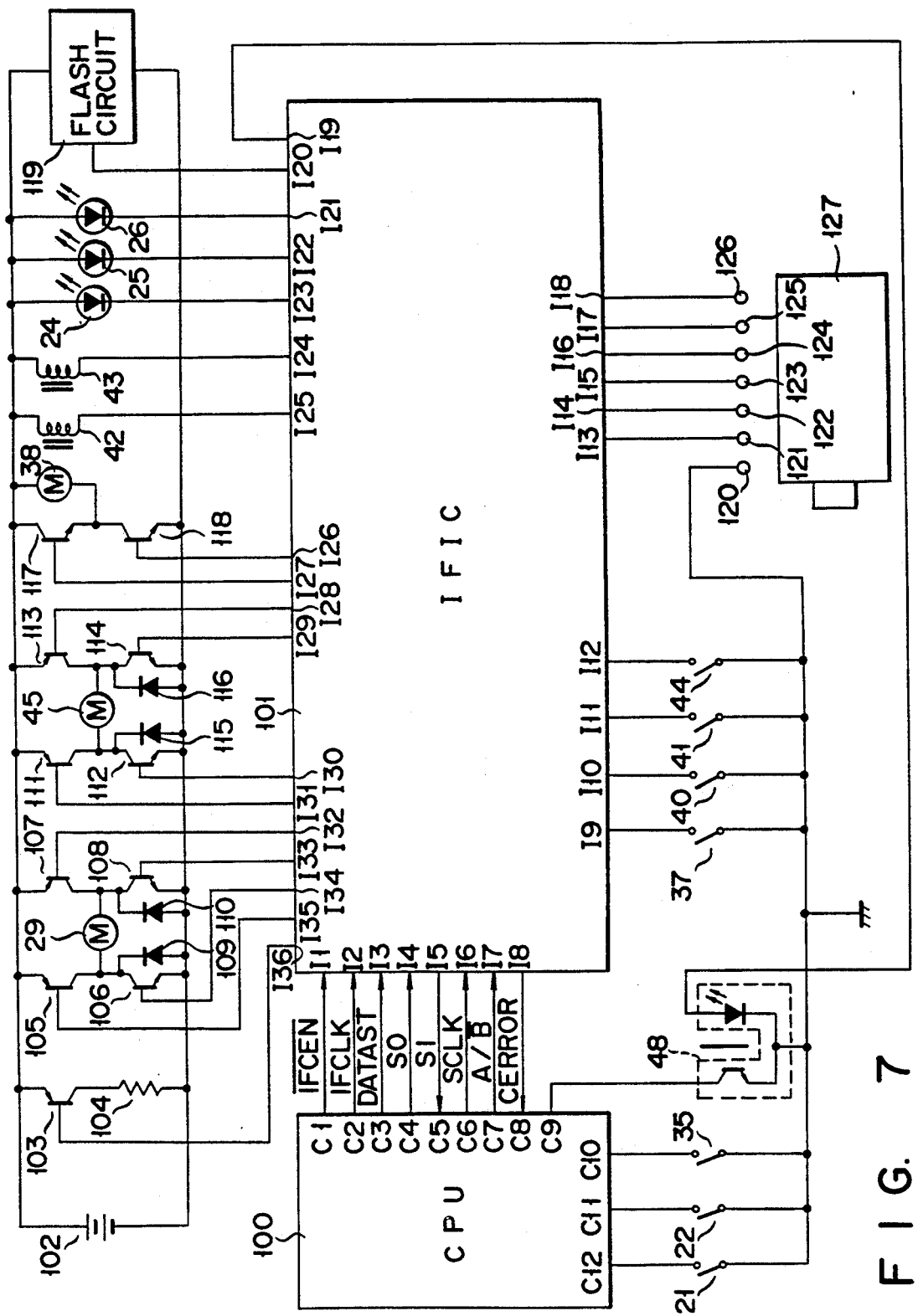
F I G. 7

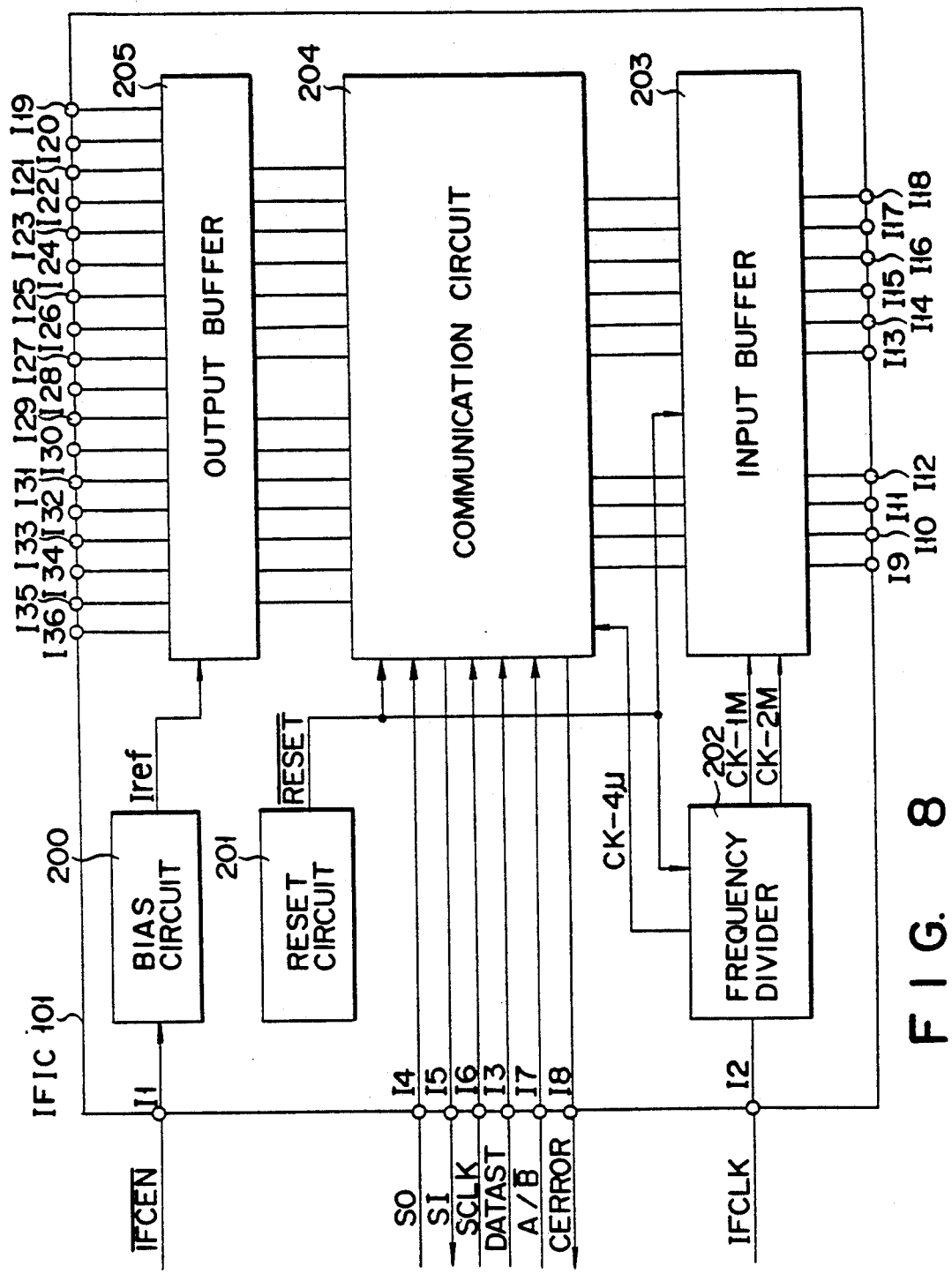
F I G. 8

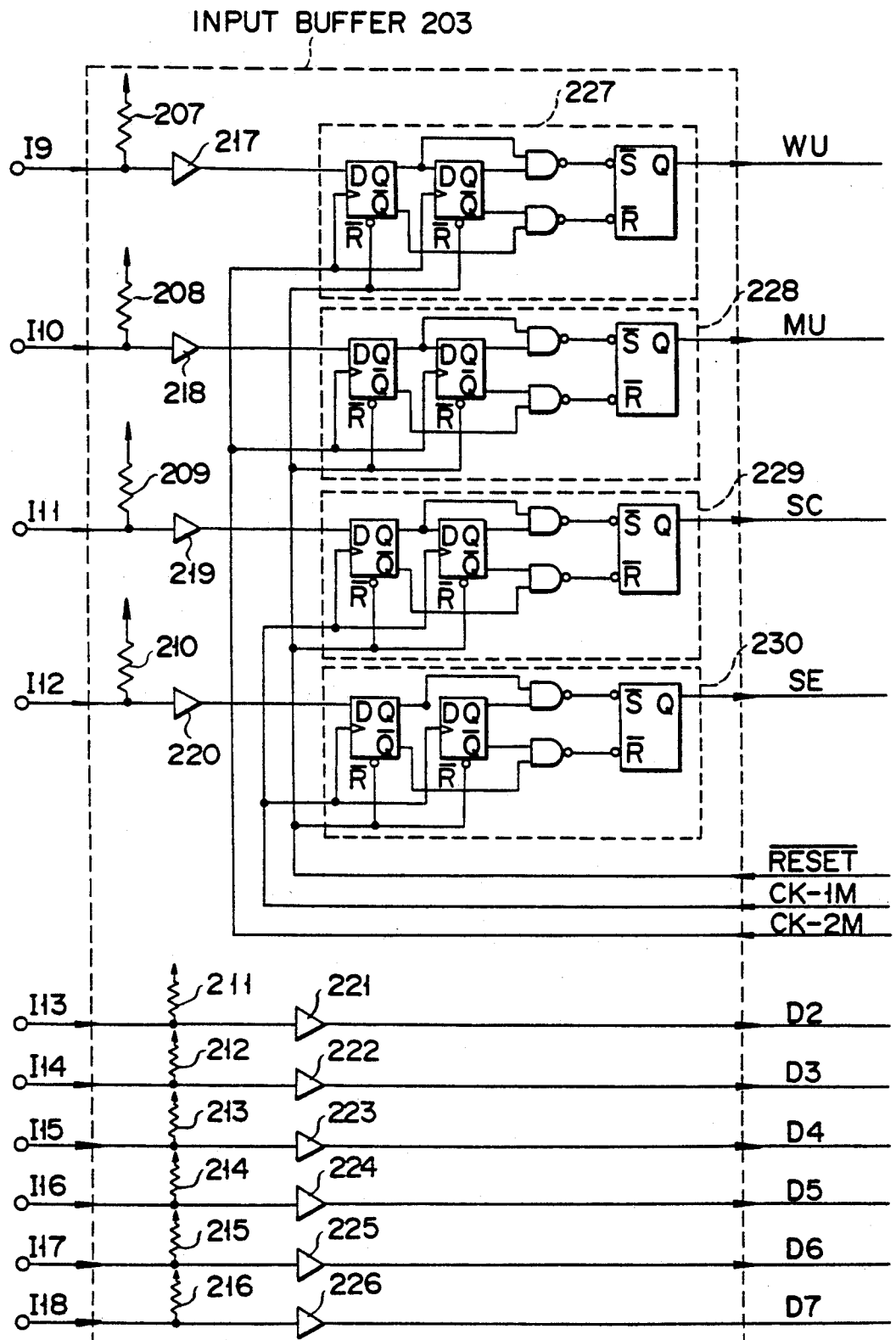
F I G. 10

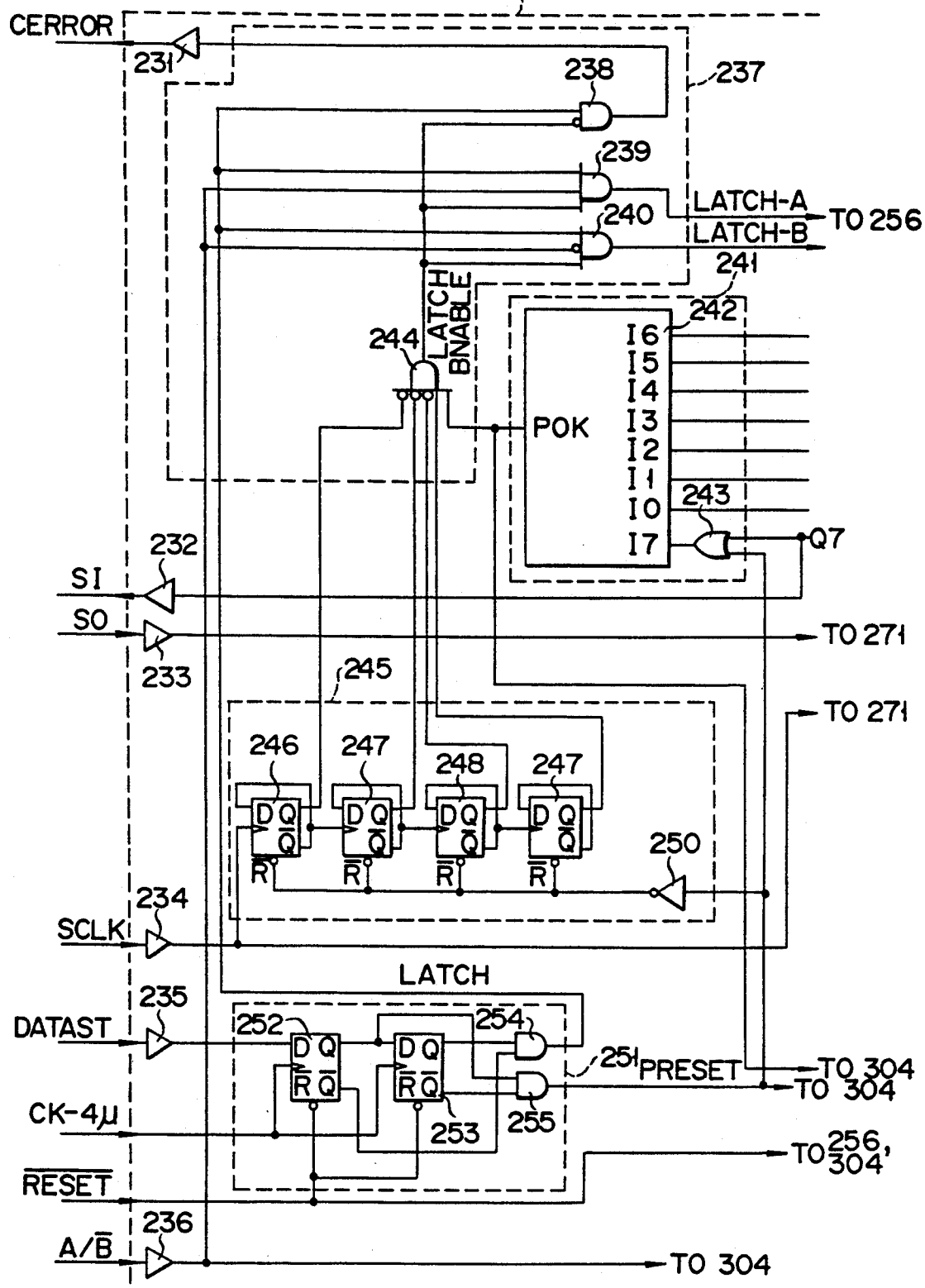
F I G. 11B

| CH | BIT | FUNCTION | | NAME |
|---|---|---|---|---|
| A | LSB | DUMMY LOAD CONTROL | | DM |
| | 1 | FILM MOTOR CONTROL | 00···OFF 01···FORWARD 10···BACKWARD 11···BRAKE | FM0 |
| | 2 | | | FM1 |
| | 3 | AF MOTOR CONTROL | 00···OFF 01···FORWARD 10···BACKWARD 11···BRAKE | AM0 |
| | 4 | | | AM1 |
| | 5 | MS MOTOR CONTROL | 00···OFF 01···FORWARD 10···BRAKE | MM0 |
| | 6 | | | MM1 |
| | MSB | PARITY BIT | | PA |
| B | LSB | 1ST-SHUTTER CURTAIN CONTROL | | MGF |
| | 1 | 2ND-SHUTTER CURTAIN CONTROL | | MGS |
| | 2 | BACKLIGHT LED CONTROL | | BL |
| | 3 | SELF-TIMER LED CONTROL | | SL |
| | 4 | AF LED CONTROL | | AL |
| | 5 | FLASH CONTROL | | X |
| | 6 | PLED CONTROL | | PL |
| | MSB | PARITY BIT | | PB |

FIG. 13

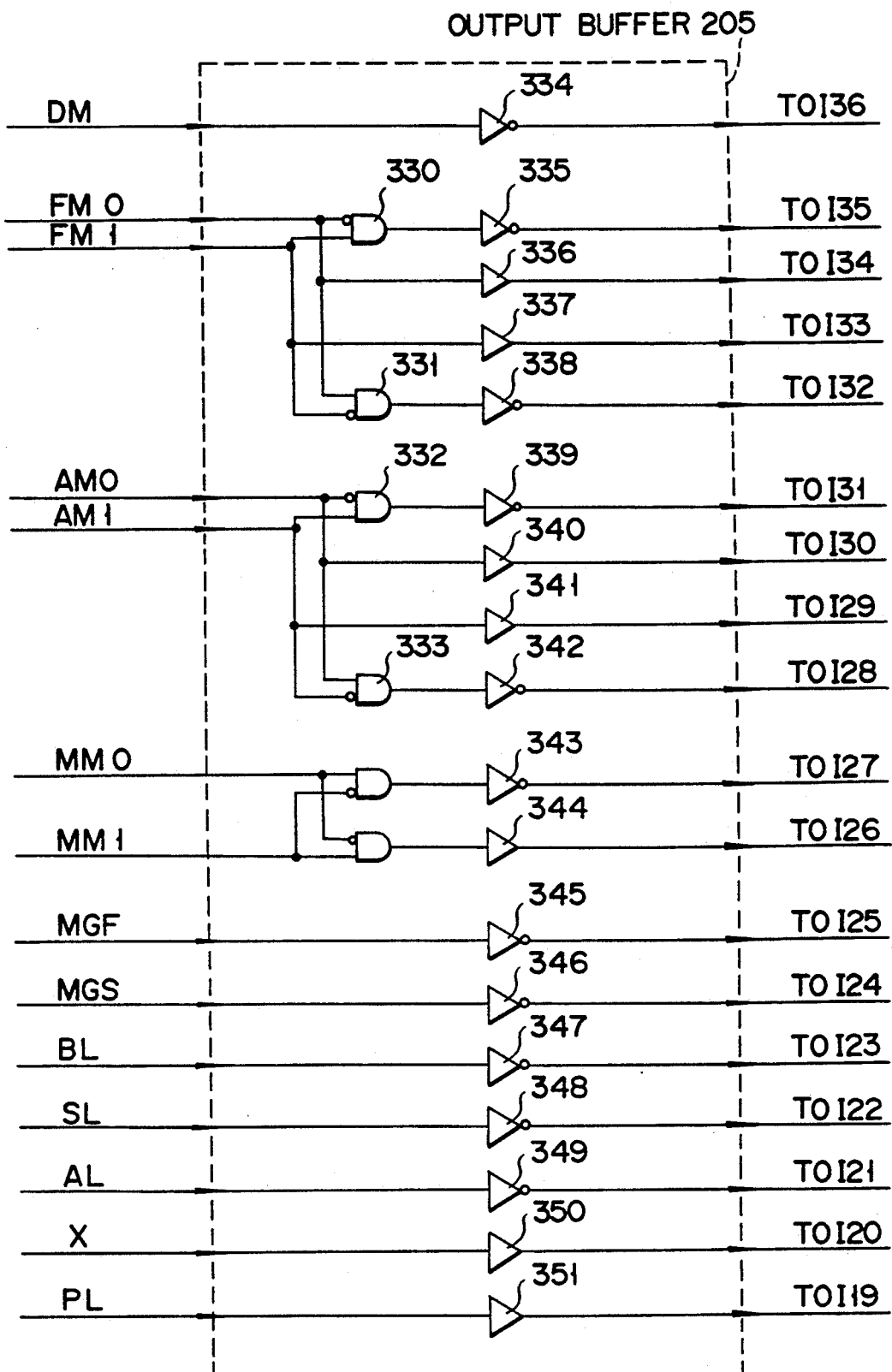
F I G. 14

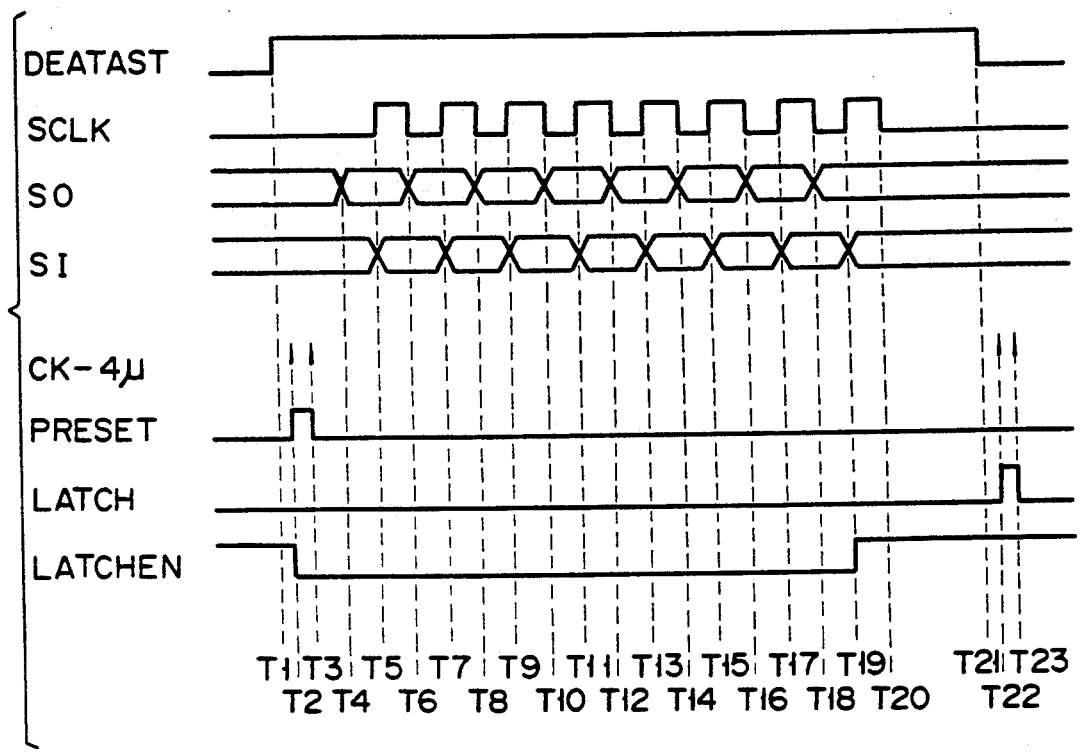
F I G. 15

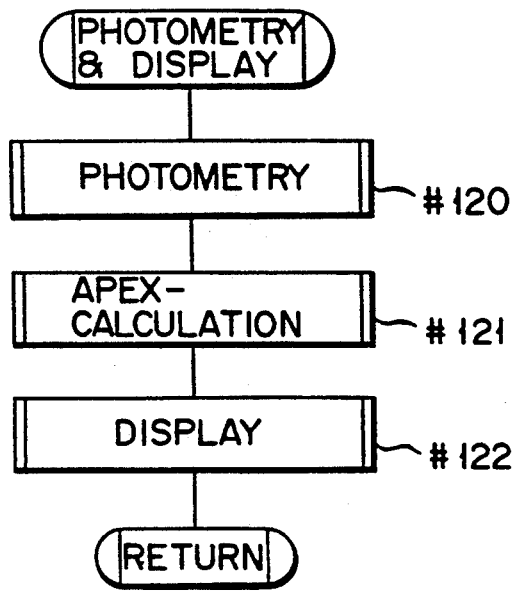
F I G. 19
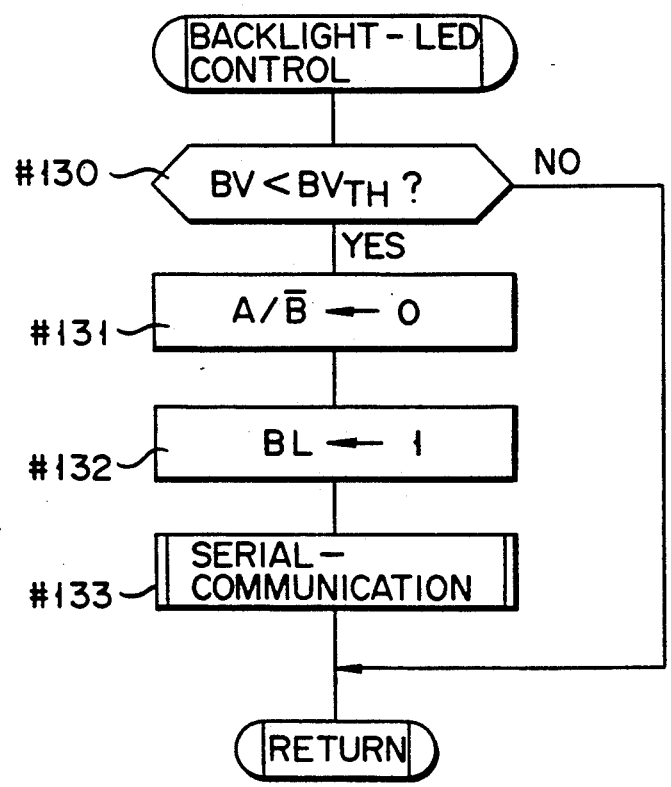
F I G. 20

CAMERA DRIVING CIRCUIT

This application is a continuation of application Ser. No. 07/662,491, filed Feb. 27, 1991, which is a continuation of U.S. Ser. No. 07/393,900, filed Aug. 14, 1989 now abandoned.

BACKGROUND OF THE INVENTION

1. Field of the Invention

The present invention relates to a driving circuit for a camera, and more particularly to a driving circuit for the so-called electrically operated camera using drive motors for winding and rewinding a film, charging the shutter and so on.

2. Description of the Related Art

Such a driving circuit for an electrically operated camera generally comprises a central processing unit (CPU) for sequence control and drivers for driving motors. The driver is generally composed of bridge circuits comprising bipolar transistors. In this case a predriver needs to be connected between the CPU and the driver for the following reasons. A battery is commonly used for the power source of the camera and thus there is a need for a CPU of a low current dissipation type. In general, therefore, a CMOS type of CPU is used. With the CMOS type of CPU, its design rule has become increasingly small. Hence it is small in output driving capability, low in output withstand voltage and small in current supply capability at its I/O ports, thereby failing to directly drive the bipolar transistors of the bridge circuits.

A prior art of such a camera driving circuit is shown in FIG. 1. CPU 1 is used for controlling a sequence of overall operations. First and second motors (driving sources of a camera) 2 and 3 are controlled by bridge circuits 4 and 5, respectively. The bridge circuits are each composed of bipolar transistors as shown. Between CPU 1 and bridge circuits 4 and 5 is connected a predriver circuit 6 which is composed of discrete components such as bipolar transistors, resistors, etc. If the predriver is formed of discrete components as described above, when the number of the motors to be controlled increases, the component count will increase accordingly. This will increase the space occupied by a circuit board, the number of steps for assembly and manufacturing cost.

Another prior art is shown in FIG. 2 according to which the component count does not increase even if the motors increase in number. This prior art is described in U.S. Pat. No. 4,772,908. CPU 1 and bridge circuits 4, 5 are the same as those in FIG. 1. Pre-driver 7 is composed of a monolithic IC in place of discrete components. The monolithic IC is of a bipolar type and incorporates a decode circuit for decoding digital signals from CPU 1 and a driver circuit for driving bridge circuits 4 and 5. With the monolithic IC pre-driver incorporating the decode circuit and the driver circuit, the component count does not increase even if the motors to be controlled increases in number. However, a problem with the prior art is that the number of signal lines connected between CPU 1 and pre-driver 7 increases.

SUMMARY OF THE INVENTION

It is accordingly an object of the present invention to provide a camera driving circuit which avoids an increase of the component count of a pre-driver making up for low current supply capability of a CPU and an increase in number of signal lines connected between the CPU and the pre-driver even if the number of objects to be controlled by the CPU increases.

According to the present invention, there is provided a camera driving circuit comprising a central processing unit for sequence control of various operations of the camera; a plurality of controlled objects including various actuators for camera mechanisms; and an integrated-circuit interface connected between the central processing unit and the controlled objects and connected to the central processing unit with a serial data communication line system having at least one data line and at least one clock line for serial data communication with the central processing unit, the interface including a serial-to-parallel conversion circuit for converting serial data transmitted over the serial data communication line system to parallel data, a latch circuit for latching the parallel data output from the serial-to-parallel conversion circuit, and an output buffer circuit responsive to output signals of the latch circuit for providing drive signals to the controlled objects.

BRIEF DESCRIPTION OF THE DRAWINGS

FIG. 7 is a schematic diagram of the camera driving circuit according to the second embodiment;

FIG. 8 is a detailed block diagram of the interface IC of FIG. 7;

FIG. 10 illustrates a detailed circuit arrangement of the input buffer of FIG. 8;

FIG. 13 is a diagram explanatory of communication data transmitted from the CPU of FIG. 7;

FIG. 14 illustrates a detailed circuit arrangement of the output buffer of FIG. 8;

FIG. 15 is a timing diagram of serial data communication;

FIG. 19 is a flowchart of the subroutine "photometry & display" of FIG. 16A;

FIG. 20 is a flowchart of the subroutine "backight-LED control" of FIG. 16A;

DETAILED DESCRIPTION OF THE PREFERRED EMBODIMENT

Figure 1:
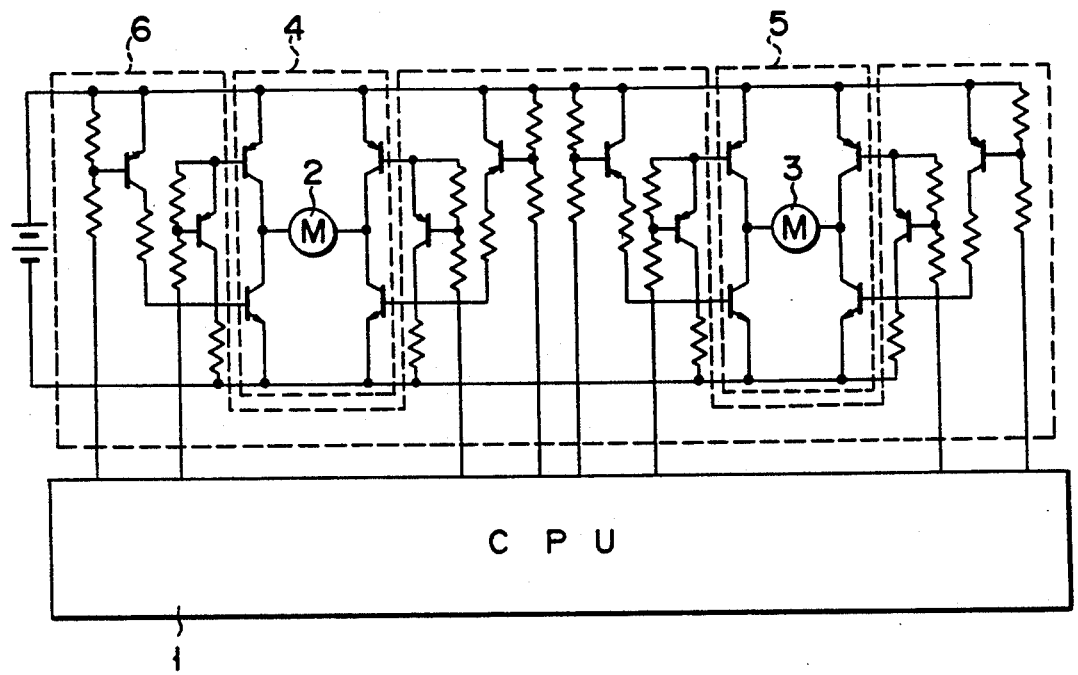
FIGS. 1 and 2 are block diagrams of prior art camera driving circuits.
Figure 2:
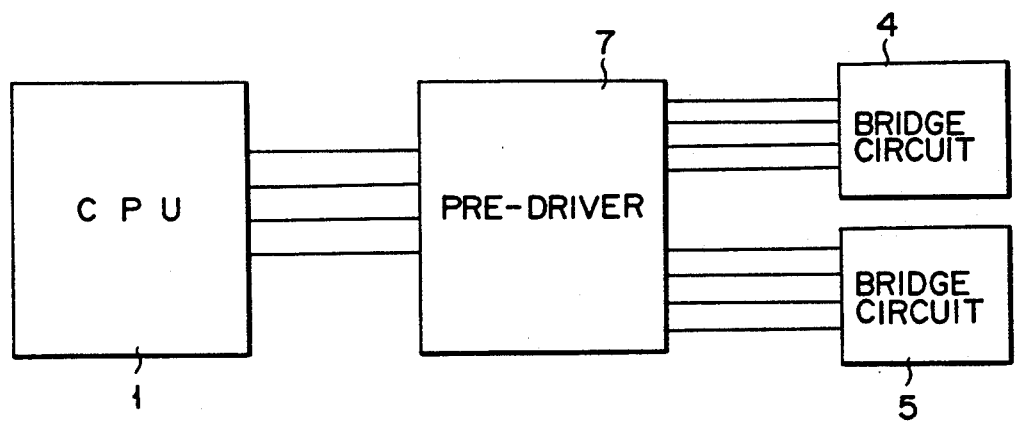
Figure 3:
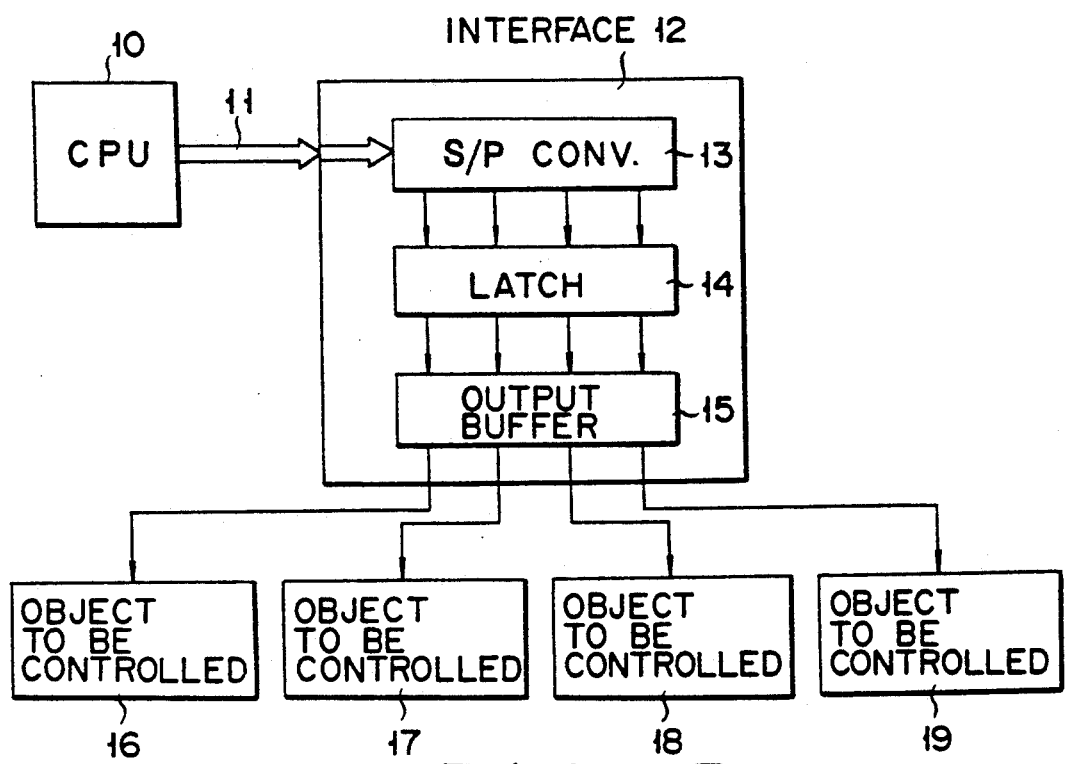
FIG. 3 is a block diagram of a camera driving circuit according to a first embodiment of the present invention.

Referring now to FIG. 3, there is illustrated a first embodiment of the present invention in which an interface 12 serving as a pre driver is connected between a CPU 10 adapted for sequence control of a camera and controlled systems or objects 16 to 19. Interface 12 is formed of a monolithic integrated circuit (IC). Specifically controlled objects 16 to 19 are transistors forming bridge circuits of drivers for controlling motors in the camera. CPU 10 and interface 12 are connected together by a serial data communication line system 11 which comprises at least one serial data line and at least one serial clock line. Interface 12 comprises a serial-to-parallel (S/P) conversion circuit 13 for converting serial data from serial data communication line system 11 to parallel data, a latch circuit 14 for holding parallel data output from serial-to-parallel conversion circuit 13, and an output buffer circuit 15 responsive to output signals from the latch circuit 14 for providing drive signals to controlled objects 16 to 19.

According to the first embodiment constructed as described above, by forming interface 12 serving as the pre-driver with a monolithic IC and connecting CPU 10 and interface 12 together with serial data communication line system 11, it becomes possible to avoid an increase in number of components involved in the pre-driver and an increase in number of signal lines connected between the CPU and the pre driver.

Figure 4:
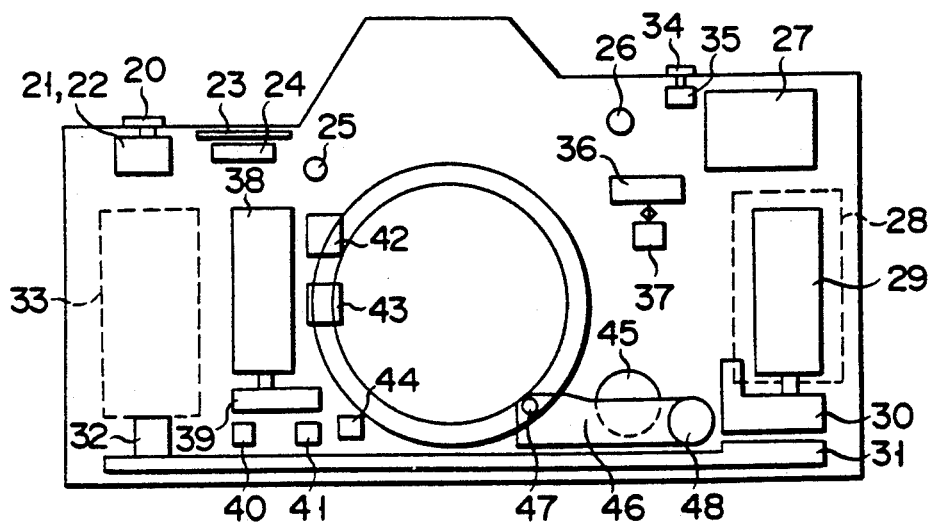
FIG. 4 is a front view of a single-lens reflex camera to be controlled by a camera driving circuit according to a second embodiment of the present invention.

Next, a second embodiment of the present invention adapted for a single lens reflex camera will be described. FIG. 4 illustrates the internal structure of the single lens reflex camera viewed from its front. Under a shutter release button 20 are disposed a first release switch (1RSW) 21 and a second release switch (2RSW) 22. First release switch 21 is turned on with a first stroke of shutter release button 20, while second release switch 22 is turned on with a second stroke of shutter release button 20. When first release switch 21 is turned on, a camera driving circuit (FIG. 7) is activated so that photometry or automatic focusing (AF) is initiated. When second release switch 22 is turned on, the exposure sequence is initiated. In the upper surface of the camera body is disposed an LCD panel 23 which visually displays the results of photometry operation, photographing modes and the like. Under LCD panel 23 is disposed a backlight source 24 for illuminating LCD panel 23 from behind. Backlight source 24 is formed of a light emitting diode (LED) which is responsive to a photometry circuit (not shown) built in finder optics to be automatically lit when photographing in the dark. An LED 25 is provided on the front surface of the camera body, which is lit at regular intervals while a self-timer is operative, thereby visually displaying that the self timer is now operating. An electric flash 27 is also built in the front surface of the camera body.

A portion 28 indicated by a broken line designates a spool for winding up a film used for photographing, within which a film motor 29 for film-wind and -rewind is disposed. A gear train 30 for film-wind is disposed under film motor 29. When film motor 29 rotates in the forward direction, torque of the motor 29 is transmitted to spool 28 through gear train 30 to wind up the film. Under film-wind gear train 30 is disposed a film-rewind gear train 31 which transmits motor torque to a rewind fork 32 when film motor 29 rotates in the reverse direction. A portion indicated by a broken line 33 designates a film magazine loaded into a film magazine chamber within the camera body. Rewind fork 32 is linked with the spool of the film magazine so that the film is rewound as rewind fork 32 rotates. On the top surface of the camera body is provided a rewind button 34 under which a rewind switch 35 is disposed. When rewind switch 35 is turned on, the film rewind is initiated. A driven sprocket 36 disposed to fit into film perforations (not shown) rotates as the film is wound and makes one rotation for one-frame film advance. Coupled with driven sprocket 36 is a one-frame film-winding switch 37 to detect the film-winding of one frame.

Figure 5:
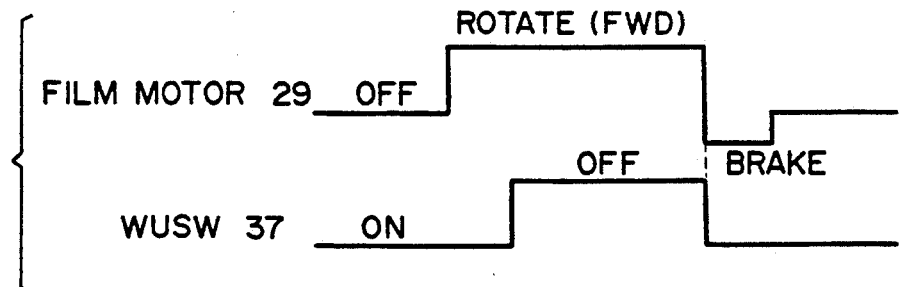
FIG. 5 is a timing diagram explanatory of the operation of film winding operation.

The action of one-frame film-winding switch 37 at a time of one-frame film advance is illustrated in FIG. 5. That is, one-frame film-winding up switch (WUSW) 37 is in the on-state before one-frame film advance is initiated and changed over from the on-state to the off-state immediately after the film advance is initiated by the forward rotation of film motor 29. At a time when one-frame film-winding up is completed, switch 37 is again changed over from the off-state to the on-state. Consequently film motor 29 stops rotating. In practice, film motor 29 is braked for a given time interval and then stops. Also at a time when the film is rewound, one-frame film-winding up switch 37 is turned on or off repeatedly, thus permitting the detection of completion of film rewind.

Referring back to FIG. 4, a mirror/shutter charge motor 38 for moving a reflex mirror up and down and charging the shutter is provided in the vicinity of the lens mount attached to the camera body. Since the present embodiment is directed to a single-lens reflex camera, a reflex mirror (not shown) is required to direct light passed through the photographing lens to finder optics. The mirror is lifted up at a time of exposure so that light passed through the photographing lens is allowed to incident onto the film. Since the camera of the present invention uses a focal-plane shutter, a mechanism is required to spring-charge the shutter. By rotating in one direction, mirror/shutter motor 38 carries out the up-down movement of the mirror and the shutter charge sequentially. To mirror/shutter motor 38 is coupled a gear train 39 for transmitting motor torque to the mirror up-down mechanism and the shutter charging mechanism. A mirror-up switch 40 and a shutter charge switch 41 are disposed in the vicinity of gear train 39. At one end of the focal plane shutter there are provided a first-shutter curtain arresting magnet 42, a second-shutter curtain arresting magnet 43, and a second-magnet termination switch 44 which is brought to the off-state when the run of the followingshutter curtain terminates.

Figure 6:
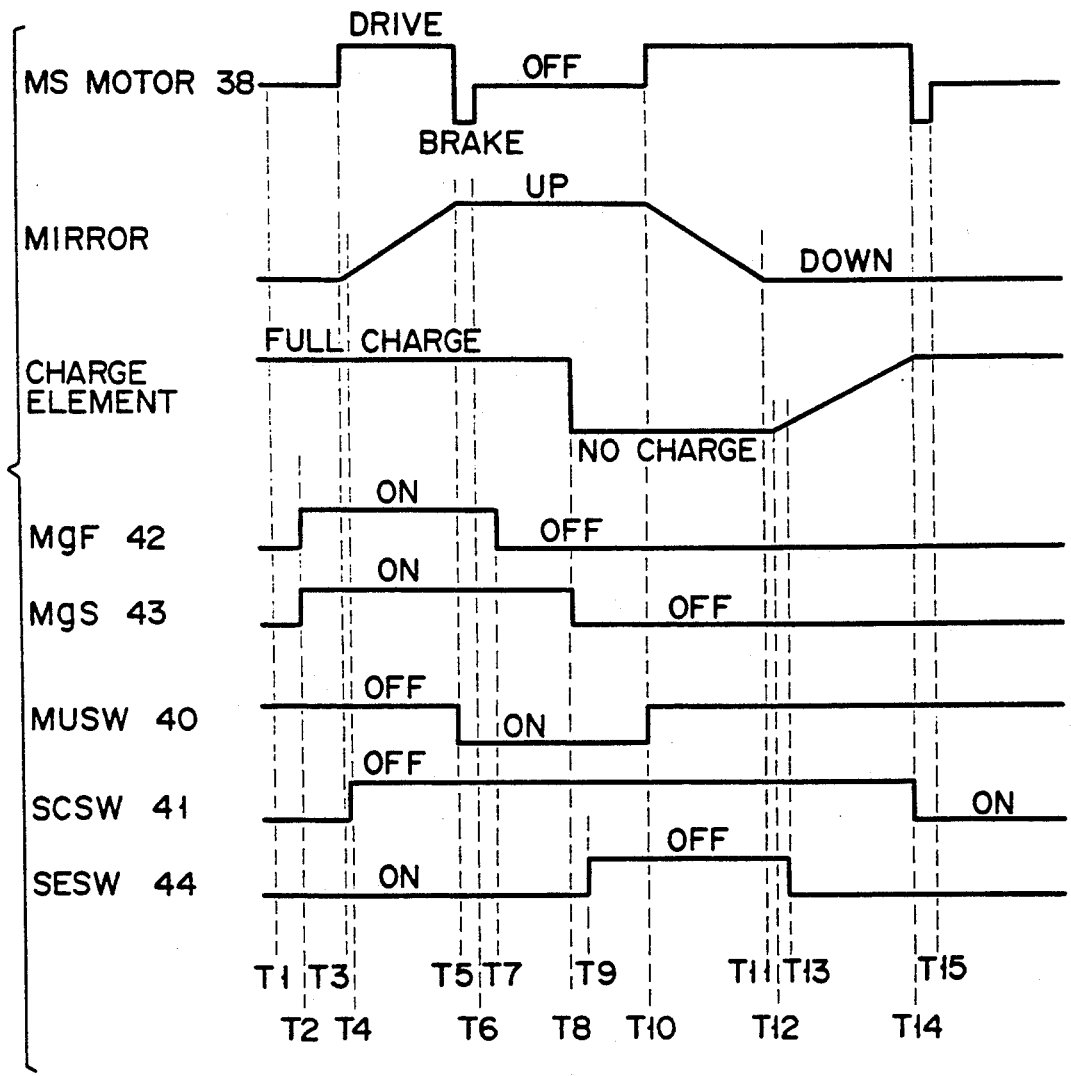
FIG. 6 is a timing diagram explanatory of the exposure sequence.

The operation of exposure proceeds in the sequence of the mirror-up, the initiation of run of the first shutter curtain, the initiation of run of the second shutter curtain, the mirror-down, and the shutter charge. This exposure sequence will be described with reference to a timing chart shown in FIG. 6. At a point of start of the exposure sequence, i.e., at time T1, the first and second shutter curtains are arrested by hooks not shown in FIG. 4. At time T2 first-shutter curtain arresting magnet (MgF) 42 and second-shutter curtain arresting magnet (MgS) 43 are energized to be brought to the on-state. As a result, the first and second shutter curtains are attracted to magnets 42 and 43, respectively. At time T3 mirror/shutter motor (MS motor) 38 is driven. Consequently the mirror-up is initiated. The hooks arresting the first and second shutter curtains are released immediately after the mirror-up is initiated. At this time, since the first and second shutter curtains are attracted by magnets 42 and 43, the first and second shutter curtains will not run. When the reflex mirror is lifted up slightly, i.e., at time T4, shutter charge switch (SCSW) 41 is changed over from on to off. When the mirror-up is completed, that is, at time T5, mirror-up switch (MUSW) 40 is changed over from off to on. As a result, mirror/shutter motor 38 stops being driven and is then braked until time T6 at which mirror/shutter motor 38 is shut off. The interval between T5 and T6 is called the short-brake interval.

When first-shutter curtain arresting magnet (MgF) 42 is deenergized at time T7, the first shutter curtain starts to run. Although not described in detail, there is a photometry-computing sequence prior to the exposure sequence, in which a time value TV (APEX value for the shutter speed) is obtained from exposure-determining-parameters such as the film speed, the intensity of light reflected from an object to be photographed. At a time corresponding to the shutter speed (TV) elapses after the first shutter curtain has initiated to run, i.e., at time T8, second-shutter curtain arresting magnet 43 is deenergized. As a result, the second shutter curtain runs. When the run of the second shutter curtain terminates at time T9, second-magnet termination switch (SESW) 44 is changed over from on to off, thereby detecting the termination of the exposure. At time T10, mirror/shutter motor 38 is driven. Consequently the mirror-down is initiated and mirror-up switch 40 is changed over from on to off immediately. The mirror-down terminates at time T11, but mirror/shutter motor 38 continues to be driven. At time T12 the shutter charging is initiated. At a time slightly after the shutter charging has been initiated, i.e., at time T13, second-magnet termination switch 44 is changed over from off to on. Shutter charge switch 41 is changed over from off to on at time T14. As a result, the termination of the shutter charging is detected, thereby stopping the drive of mirror/shutter motor 38. Subsequently the short braking is initiated and then terminated at time T15. The exposure sequence thus terminates. Thereafter, the one-frame film-winding up sequence described previously is carried out.

Referring back to FIG. 4, there is an automatic focusing (AF) motor 45 for moving the photographing lens inward and outward. At the lens mount there is provided a linking member 47 for transmitting the torque of AF motor 45 to the lens. The amount of rotation of AF motor 45 is detected by a photo-interrupter 48. The torque of AF motor 45 is transmitted to linking member 47 and photo-interrupter 48 through gear train 46. On the front surface of the camera body there is provided a light emitting diode (LED) 26 for emitting AF auxiliary light. Though not shown in FIG. 4, the present embodiment employs a passive type of AF sensor and thus measures distance in the dark while lighting AF LED 26. This is because, in the dark, the distance measurement cannot be made only under natural light.

Next, a circuit arrangement of a second embodiment will be described with reference to FIG. 7. This driver circuit includes a CPU 100 for sequence control of the camera and an interface IC (hereinafter referred to as IFIC) 101 serving as a predriver interposed between controlled objects, such as motors, and the CPU. The terminals C1 to C8 of CPU 100 are connected to terminals I1 to I8 of IFIC 101 by communication lines labeled $\overline{IFCEN}$, IFCLK, DATAST, SO, SI, SCLK, A/$\overline{B}$ and CERROR, respectively. The communication lines other than $\overline{IFCEN}$ and IFCLK are associated with serial data communication. While a clock-locked full-duplex simultaneous transmission/reception system is adopted here for the serial data communication system, any other communication system may be employed. Communication line $\overline{IFCEN}$ is used for transmitting a activation signal from CPU 100 to IFIC 101, which activates IFIC 101 when the activation signal is at a low ("L") level. Communication line IFCLK is used for transmitting a system clock from CPU 100 to IFIC 101, whose frequency is set to 256 KHz. Communication line DATAST is used for transmitting a data strobe signal for serial data communication from CPU 100 to IFIC 101. Communication line SO is used for transmitting a serial data communication signal from CPU 100 to IFIC 101. Communication line SI is used for transmission of a serial data communication signal from IFIC 101 to CPU 100 as opposed to communication line SO. Here, it is assumed that data is composed of 8 bits. Communication line SCLK is used for transmitting a clock signal for serial data communication from CPU 100 to ICIF 101. One clock pulse is transmitted each time one bit of data is transmitted. IFIC 101 contains A-channel and B-channel data latches each of 7 bits and communication line A/$\overline{B}$ is used for transmitting a latch switching signal from CPU 100 to ICIF 101 so that the A channel is selected when the switching signal is at a high "H" level. A circuit for detecting errors which may occur in serial data transmission is built in IFIC 101, and when an error is detected an error detect signal of "H" level is transmitted from IFIC 101 to CPU 100 over communication line CERROR. To input terminals C9 to C12 of CPU 100 are respectively connected a photo transistor of a photo-interrupter 48, a rewind switch (RWDSW) 35, a second-release switch (2RSW) 22 and a first-release switch (1RSW) 21.

To input terminals I9 to I12 of IFIC 101 are respectively connected a wind-up switch (WUSW) 37, a mirror-up switch (MUSW) 40, a shutter charge switch (SCSW) 41, and a second-magnet termination switch (SESW) 44. Input terminals I13 to I18 of IFIC 101 are connected to DX2 to DX7 contacts 121 to 126 so as to read a DX code of a film magazine 33 loaded into the film chamber within the camera body. The DX1 contact 120 is connected to ground. Output terminals I19 to I25 of IFIC 101 are connected to an LED of photo-interrupter 48, a flash circuit 119, an AF LED 26, a self-timer LED 25, a backlight LED 24, a second-shutter curtain arresting magnet (MgS) 43, and a first-shutter curtain arresting magnet (MgF) 42, respectively. The flash circuit 119 is built in the camera body and is responsive to output terminal I20 going to "H"0 level to cause electronic flash unit 27 to produce a flash of light.

Output terminals I26 to I35 of IFIC 101 are connected to the bases of bipolar transistors 118, 117, 113, 114, 112, 111, 107, 108, 106, and 105, respectively. Transistors 118 and 117 have their collector-to-emitter paths connected in series, the junction thereof being connected to a mirror/shutter motor (MS motor) 38. Transistor 117 serves as a short braking transistor for MS motor 38, while transistor 118 serves as a driving transistor for MS motor 38. Transistors 111, 112, 113, and 114 form a transistor bridge for driving AF motor 45. When transistors 111 and 114 are rendered conductive, AF motor 45 rotates in the forward direction to move the lens outward. When transistors 112 and 113 are rendered conductive, on the other hand, AF motor 45 rotates in the reverse direction so that the lens is moved inward. Furthermore, when transistors 112 and 114 are rendered conductive, a short brake is applied to AF motor 45. Diodes 115 and 116 are connected in parallel with transistors 112 and 114, respectively, in order to bypass motor currents at a time of application of short brake. Similarly, transistors 105, 106, 107 and 108 form a transistor bridge adapted for driving a film motor 29. When transistors 105 and 108 are rendered conductive, film motor 29 rotates in the forward direction to wind up the film. When transistors 106 and 107 are rendered conductive, on the other hand, film motor 29 rotates in the reverse direction to rewind the film. When transistors 106 and 108 are rendered conductive, a short brake is applied to film motor 29. Similarly, diodes 109 and 110 are connected in parallel with transistors 106 and 108, respectively, so as to bypass motor currents when short brake is applied. An output terminal I36 of IFIC 101 is connected to the base of a bipolar transistor 103. Transistor 103 forms a dummy load together with a resistor 104. The dummy load is adapted for battery checking and operates when terminal I36 goes to "L" level. Reference character 102 designates a power supply battery of the camera.

Figure 9:
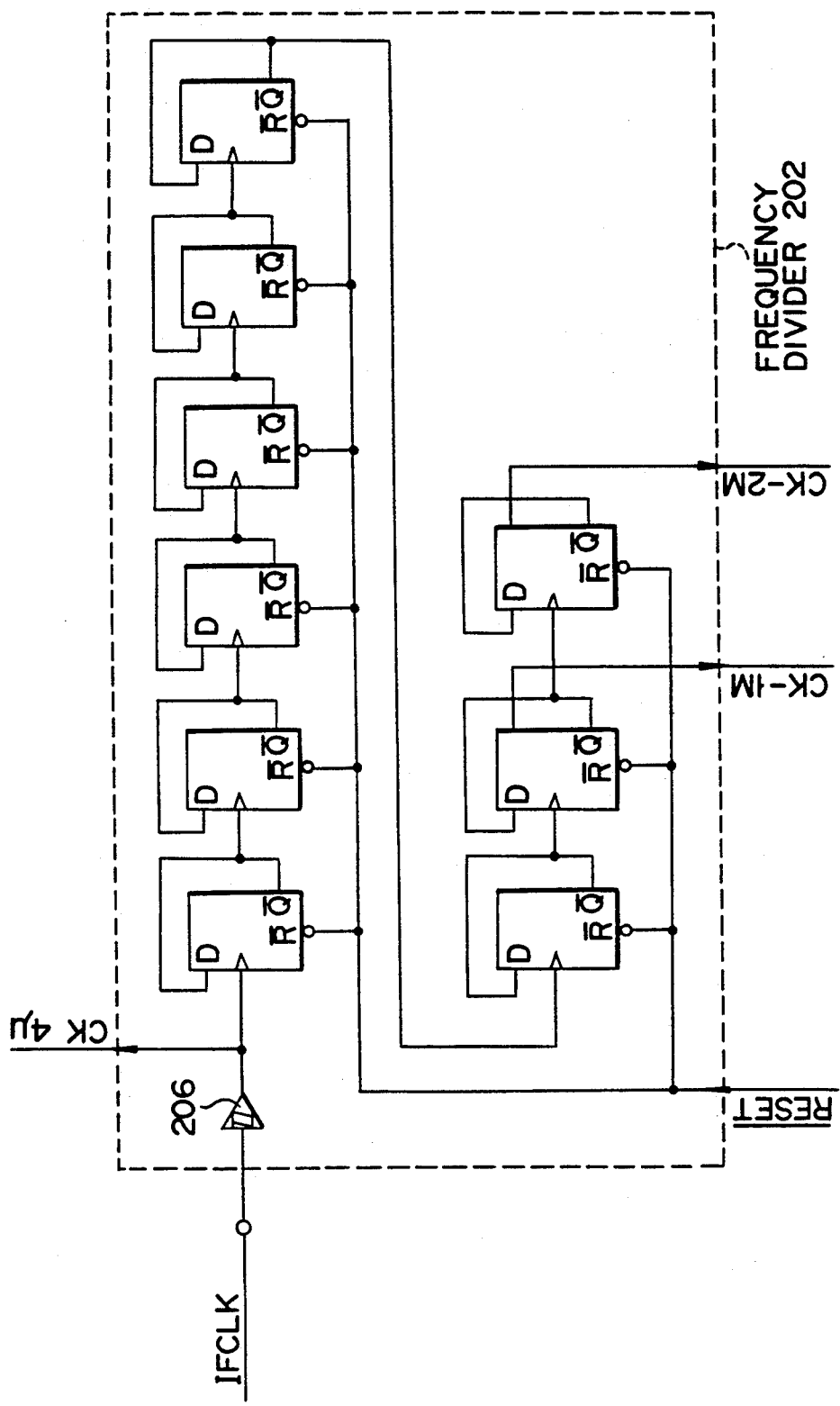
FIG. 9 illustrates a detailed circuit arrangement of the frequency divider of FIG. 8.

Next, the internal arrangement of IFIC 101 will be described with reference to FIG. 8. IFIC 101 is an integrated circuit manufactured by Bi-CMOS process and comprised mainly of six blocks: a bias circuit 200; a reset circuit 201; a frequency divider circuit 202; an input buffer circuit 203; a communication circuit 204; and an output buffer circuit 205. These blocks will be described in sequence. Bias circuit 200 is adapted to produce a reference current Iref and operates to feed it to output buffer circuit 205 when communication line $\overline{IFCEN}$ (input terminal I1) is at "L" level. Reset cuit 201 is adapted to produce and supply a power-on reset signal ($\overline{RESET}$) to communication circuit 204, frequency divider 202, and input buffer circuit 203 when power is applied to IFIC 101. Signal $\overline{RESET}$ is normally at "H" level and momentarily goes to "L" level when power is turned on. Frequency divider 202 divides the frequency of the system clock (256 KHz) transmitted over communication line IFCLK (input terminal I2) to produce clock signals required within IFIC 101. FIG. 9 shows a detailed circuit arrangement of frequency divider 202, which provides a clock signal CK-4$\mu$ (a cycle period of 4 $\mu$sec) which is obtained by passing the system clock through a Schmitt-Buffer 206, a clock signal CK-1M (a cycle period of 1 msec) which is obtained by dividing clock signal CK-4$\mu$ in frequency by a factor of eight, and a clock signal CK-2M (a cycle period of 2 msec) obtained by dividing clock signal CK-4$\mu$ in frequency by a factor of nine.

Referring back to FIG. 8, input buffer circuit 203 properly processes signals applied to its input terminals I9 to I18 from film-winding up switch 37, mirror-up switch 40, shutter charge switch 41, second magnet termination switch 44, and DX2 to DX7 contacts 121 to 126 and feeds the results of signal processing to communication circuit 204. A detailed circuit diagram of input buffer circuit 203 is shown in FIG. 10. This circuit has pull-up resistors 207 to 216, buffers 217 to 226, and chattering killer circuits 227 to 230 for removing chatterings of mechanical switches connected to input terminals I9 to I12. Chattering killer circuit 227 samples an output signal of buffer 217 on the leading edges of the clock signal CK-2M. If the output of buffer 217 is at "H" level at two successive sampling points, then an output signal WU of chattering killer circuit 227 is rendered high. If the output of buffer 217 is low at two successive sampling points, then output signal WU is rendered low. That is, chattering within two cycles of the sampling clock is ignored. Other chattering killer circuits 228 to 230 ar the same as circuit 227 in arrangement. However, it is to be noted that chattering killer circuit 228 uses clock signal CK-2M as its sampling clock to provide an output signal MU, while chattering killer circuits 229 and 230 use clock signal CK-1M as their sampling clocks to provide output signals SC and SE. The cycle period of the sampling clock for each chattering killer circuit is selected in conformity with the chattering characteristic of a corresponding switch. Signals from DX2 to DX7 contacts connected to input terminals I13 to I18 have no chattering and thus are output as signals D2 to D7 simply by passing through buffers 221 to 226.

Referring back to FIG. 8, communication circuit 204 convert serial data transmitted thereto from CPU 100 over the serial data communication line to parallel data for application to output buffer circuit 205 and moreover converts parallel data supplied thereto from input buffer circuit 203 to serial data for transmission to CPU 100 over the serial data communication line.

Figure 11A:
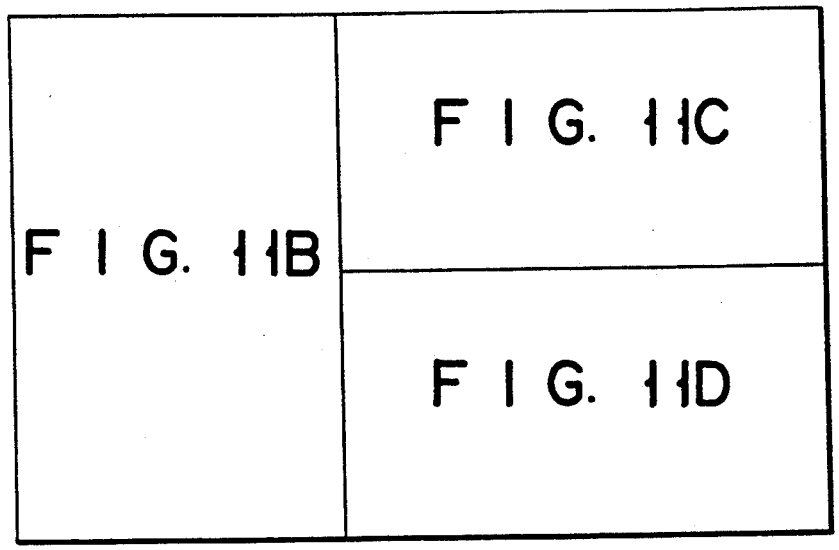
FIGS. 11B, 11C and 11D, taken together as shown in FIG. 11A, illustrate a detailed circuit arrangement of the communication circuit of FIG. 8.
Figure 11C:
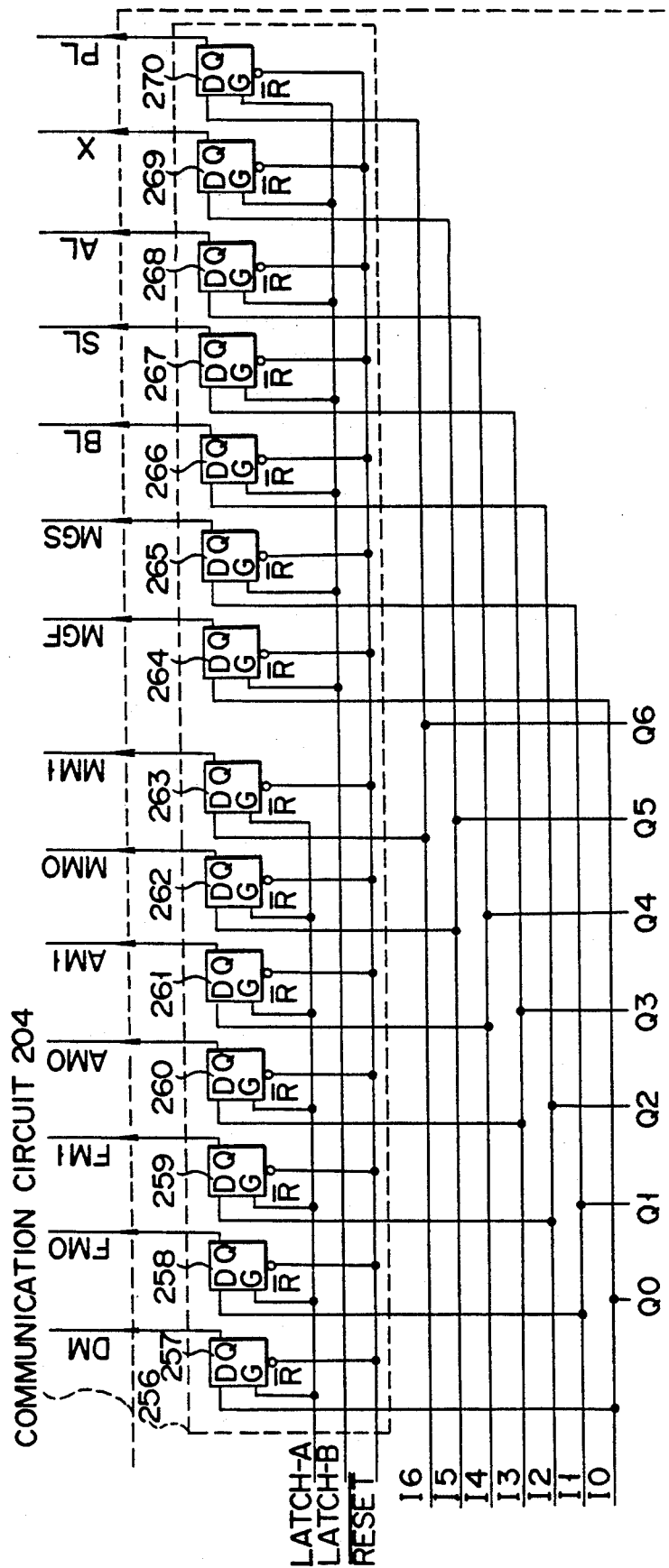
Figure 11D:
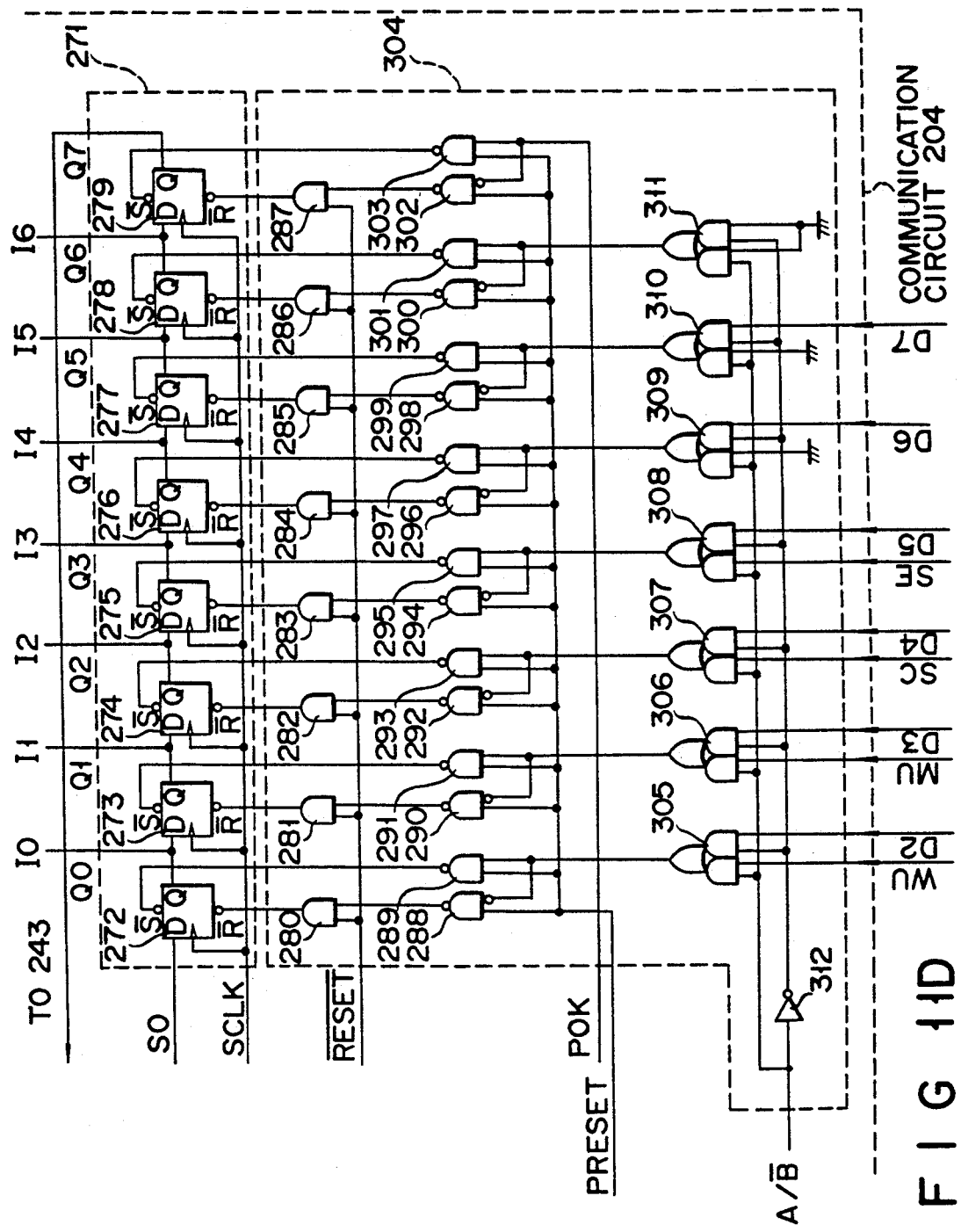

A detailed circuit diagram of communication circuit 204 is illustrated in FIGS. 11B, 11C, and 11D. Communication lines CERROR, SI, SO, SCLK, DATAST and A/$\overline{B}$ are connected to buffers 231 to 236, respectively. A data strobe signal output from buffer 235 is entered into a preset & latch signal generating circuit 251, which comprises two D type flip-flops 252 and 253 and two two-input AND gates 254 and 255 to provide a preset signal (PRESET) and a latch signal (LATCH) in synchronization with the rising and falling of communication line DATAST, respectively, only during one cycle period of clock signal CK-4$\mu$. More specifically, communication line DATAST is raised from "L" level to "H" level at the beginning of serial data communication. At this instant preset & latch signal generating circuit 251 produces a preset signal for application to a preset circuit 304. Upon receipt of the preset signal, preset circuit 304 presets a parallel data signal from input buffer circuit 203 into a shift register 271. The signals from input buffer circuit 203 are separated into two groups of A and B. The group A comprises four signals of WU, MU, SC, and SE, while the group B comprises six signals of D2 to D7. AND/OR gates 305 to 311 and an inverter 312 form a select circuit adapted to select either the group A or the group B. The selection of group A or B is effected by a switch signal transmitted between CPU 100 and IFIC 101 over communication line A/$\overline{B}$. That is, when communication line A/$\overline{B}$ is at "H" level, the group A is selected, otherwise the group B is selected. At the end of serial data communication, communication line DATAST is lowered from "H" level to "L" level. At this point preset & latch signal generating circuit 251 generates a latch signal for application to a latch circuit 256 via a latch enable circuit 237. In response to the latch signal latch circuit 256 latches signals Q0 to Q6 from shift register 271.

Upon receipt of a preset signal from preset & latch signal generating circuit 251 two-input NAND gates 288 to 303 of preset circuit 304 apply set signals or reset signals to D type flip-flops 272 to 279 in shift register 271 according to output levels of AND/OR gates 305 to 311. For example, if the output level of AND/OR gate 305 is at "H" level when the preset signal goes to "H" level, then the output of NAND gate 289 goes to "L" level, thus setting D type flip-flop 272. When the output of AND/OR gate 305 is "L" level, on the other hand, the output of NAND gate 288 goes to "L" level, thus resetting D type flip-flop 272. Two-input AND gates 280 to 287 is responsive to a signal RESET from reset circuit 201 to power-on reset shift register 271 forcibly. Shift register 271 is composed of D type flip-flops 272 to 279 with set and reset terminals and has a function of converting serial data transmitted over serial data communication line SO to parallel data Q0 to Q6 for application to latch circuit 256 and a function of converting parallel data from preset circuit 304 to serial data for transmission over serial data communication line SI. Latch circuit 256 is composed of an A-channel latch comprised of D type latches 257 to 263 and a B-channel latch comprised of D type latches 264 to 270. The A-channel latch latches outputs Q0 to Q6 of D type flip-flops 272 to 278 of shift register 271 in response to a latch-A signal (LATCHA) from latch enable circuit 237. The B-channel latch latches outputs Q0 to Q6 of D type flip-flops 272 to 278 of shift register 271 in response to a latch-B signal (LATCHB) from latch enable circuit 237.

Clock counter 245 receiving the system clock from buffer 234 connected to communication line SCLK is composed of D type flip-flops 246 to 249 and an inverter 250. Clock counter 245 is reset by a preset signal from preset & latch signal generating circuit 251 and incremented by one by the leading edge of each system clock pulse. During a communication of serial data the system clock signal rises the number of times equal to the number of bits of the serial data (in this example, eight times) with the result that the outputs of D type flip-flops 246 to 249 finally go to "L", "L", "L", and "H" levels, respectively. Clock counter 245 is used for checking communication errors. More specifically, clock counter 24 prevents latch circuit 256 from latching erroneous data, for example, when more clock pulses than prescribed are transmitted because of electrostatic noise or motor noise, or when less clock pulses than prescribed are transmitted because of malfunction of CPU 100.

Parity checker & generator 241 is comprised of a parity checker (IC) 242 and an OR gate 243. The 8-bit data is sent from CPU 100 on communication line SO in a bit serial manner from MSB to LSB. The MSB is the parity bit. The type of parity check is odd parity. That is, the parity bit is set to "1" or "0" so that the number of "1" bits from MSB to LSB may be odd. The function of parity checker & generator 241 as parity checker will be explained below. At a point of time when serial data communication is completed, data bits from LSB to MSB are output to outputs Q0 to Q7 of D type flip-flops 272 to 279 of shift register 271. Since the preset signal input to an input of OR gate 243 is at "L" level at this point, OR gate 243 passes output Q7 of D type flip-flop 279 of shift register 271 intact. Thus, outputs Q0 to Q7 of D type flip-flops 272 to 279 in shift register 271 are input to input terminals I0 to I7 of parity checker 242. If the serial data communication is performed properly at this point, i.e., if the number of "1" bits at input terminals I0 to I7 is odd, then the output POK of parity checker 242 will go to "H" level. Output POK of parity checker 242 is fed to latch enable circuit 237.

Figure 12:
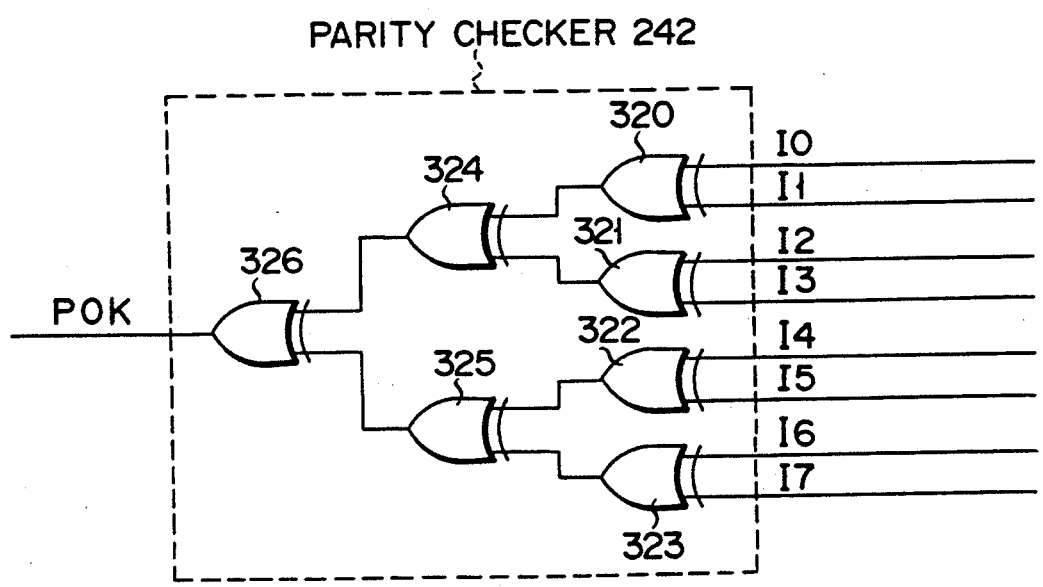
FIG. 12 illustrates a detailed circuit arrangement of the parity checker of FIG. 11B.

A detailed circuit diagram of parity checker 242 is illustrated in FIG. 12. As shown, parity checker 242 is composed of EXCLUSIVE-OR gates 320 to 326. With this circuit, when the number of "1" bits of data applied to input terminals I0 to I7 is odd, that is, when the serial data communication is effected properly, output POK goes to "H" level. On the other hand, when the number of "1" bits is even, output POK goes to "L" level. Parity checker & generator 241 may also be used for checking communication errors like clock counter 245. That is, parity checker & generator 241 can detect a communication error resulting from inversion of only on bit in serial data which might occur due to electrostatic noise or motor noise during serial communication.

Next, the function of parity checker & generator 241 as parity generator will be explained below. When preset & latch signal generating circuit 251 generates a preset signal at the beginning of serial communication, data of D type flip-flops 272 to 278 of shift register 271 are preset to "L" or "H" level by preset circuit 304. Data of D type flip-flop 279 is preset by signal POK. Outputs Q0 to Q6 of D type flip-flops 272 to 278 are coupled to input terminals I0 to I6 of parity checker 242. Output Q7 of D type flip-flop 279 is coupled to an input of two-input OR gate 243 the other input terminal of which is supplied with the preset signal. When the preset signal is at "H" level, therefore, the output of OR gate 243 goes to "H" level irrespective of the level of output Q7 of D type flip-flop 279. For this reason, when the preset signal goes to "H" level, input terminal I7 of parity checker 242 is forcibly set to the "H" level. If output signal POK of parity checker 242 is at "H" level at this point, then this signal is applied to two-input NAND gates 302 and 303 of preset circuit 304, setting D type flip-flop 279 of shift register 271. If output POK of parity checker 242 is "L" level, on the other hand, D type flip-flop 279 will be reset. In this manner the parity bit (odd parity bit) is added to data in shift register 271. Upon receipt of a latch signal from preset & latch signal generating circuit 251 latch enable circuit 237 detects the presence or absence of communication errors according to the output POK of parity checker 242 so as to apply a latch-A signal or latch-B signal to latch circuit 256 in the absence of communication errors and to transmit an error detect signal to CPU 100 over communication line CERROR instead of generating the latch-A signal or latch-B signal.

At the end of serial communication, if the clock signal is properly entered through communication line SCLK and the output POK of parity checker 242 is at "H" level, 5-input AND gate 244 provides a latch enable signal (LATCHENABLE) at "H" level. If communication line A/B̄ is at "H" level when preset & latch signal generating circuit 251 produces a latch signal at "H" level, then 3-input AND gate 239 provides a latch-A signal at "H" level. If communication line A/B is at "L" level, on the other hand, then 3-input AND gate 240 provides a latch-B signal at "H" level. In the presence of communication errors, the latch enable signal from AND gate 244 is at "L" level, irrespective of signal FCK so that, when the latch signal is applied, AND gates 239 and 240 produce no latch-A and latch-B signals of "H" levels and instead 2-input AND gate 238 produces an error detect signal which is transmitted to CPU 100 over communication line CERROR.

Latch circuit 256 has a function of holding bits of data transmitted serially from CPU 100 over communication line SO. When transmission data is to be held in the A channel latch of latch circuit 256, CPU 100 transmits the data after transmission of a switching signal at "H" level over communication line A/B̄. When the data is to be held in the B channel latch, on the other hand, CPU 100 transmits a "L" level switching signal before data communication. As a result, when the serial communication is completed, i.e., when the data strobe signal falls, the latch-A signal or latch-B signal from latch enable circuit 237 goes to "H" level, thus causing the A channel latch o B channel latch to latch outputs Q0 to Q6 of shift register. In FIG. 13, there is illustrated types of data transmitted serially from CPU 100 over communication line SO. The upper half of FIG. 13 represents data to be held in the A channel latch, while the lower half represent data to be held in the B channel latch. Names of alphanumeric characters are attached to respective bits of data. That is, the outputs of D type latches 257 to 270 of latch circuit 256 correspond to the data bits.

Referring now to FIG. 14, there is shown a detailed circuit arrangement of output buffer circuit 205. This circuit receives data bits output in parallel from communication circuit 204 and drives buffers at an output stage. Inverter buffers 334, 335, 338, 339, 342, 343, and 345 to 349 have "L" output levels when their inputs are at "H" level so that constant currents drain thereinto from external circuits. Conversely, when their inputs at "L" level, their outputs are in high impedance state so that the external circuits are inoperative. Buffers 336, 337, 340, 341, 344, 350, and 351 have "H" level outputs when their inputs at "H" levels, thus draining constant currents away to external circuits. AF motor 45. When (AM0, AM1)=(0, 0), bridge transistors Conversely, when their inputs are at "L" level, their outputs are in high impedance so that the external circuits are inoperative. That is, the two types of buffers each supply their associated external circuits with constant currents to operate them when their respective inputs are at "H" level. An explanation will be given of data bit signals entered into output buffer circuit 205. Signal DM is a dummy load control signal which, when DM=1, turns built-on transistor 103 (refer to FIG. 7) on so that the dummy load operates. Signals FM0 and FM1 are control signals for film motor 29. When (FM0, FM1) =(0, 0), bridge transistors 105 to 108 are all turned off so that film motor 29 is also turned off. When (FM0, FM1)=(0, 1), bridge transistors 105 and 108 are turned on so that film motor 29 rotates in the forward direction to wind up the film. When (FM0, FM1) =(1, 0), bridge transistors 106 and 107 are turned on so that film motor 29 rotates in the reverse direction to rewind the film. When (FM0, FM1)=(1, 1), bridge transistors 106 and 108 are turned on so that film motor 29 is subjected to short braking. Signals AM0 and AM1 are control signals for AF motor 45. When (AM0, AM1)=(0, 0), bridge transistors 111 to 114 are all turned off so that AF motor is off. When (AM0, AM1)=(0, 1), bridge transistors 111 and 114 are turned on so that AF motor 45 rotates in the forward direction to move the lens outward. When (AM0, AM1)=(1, 0), bridge transistors 112 and 113 are turned on so that AF motor 45 rotates in the reverse direction to move the lens inward. When (AM0, AM1)=(1, 1), bridge transistors 112 and 114 are turned on so that AF motor 45 is subjected to short braking. Signals MM0 and MM1 are control signals for mirror shutter motor 38. When (MM0, MM1)=(0, 0), transistors 117 and 118 are both turned off so that mirror shutter motor 38 enters the off state. When (MM0, MM1)=(0, 1), transistor 118 is turned on so that mirror shutter motor 38 becomes operative. When (MM0, MM1)=(1, 0), transistor 117 is turned on so that mirror shutter motor 38 enters the short braking state. Signal MGF is a control signal for the first shutter curtain. When MGF=1, first-shutter curtain arresting magnet MgF is energized to attract the first shutter curtain. Signal MGS is a control signal for the second shutter curtain. When MGS=1, second-shutter curtain arresting magnet Mgs is energized to attract the second shutter curtain. Signals BL, SL, and AL are control signals for backlight LED 24, self-timer LED 25 and AF auxiliary LED 26, respectively. When BL=1, SL=1 and AL=1, the LEDs are each supplied with a constant current to be lit. Signal X is a flash control signal and when X=1, a thyristor (not shown) in flash circuit 119 is rendered conductive so that electronic flash unit 27 emits a flash of light. Finally, signal PL is a control signal for the LED of photo-interrupter 48 and when PL=1, the LED is lit.

Next, the sequence of serial data communication will be described with reference to a timing chart shown in FIG. 15. In this Figure, the data strobe signal (DATAST), system clock (SCLK), data signals (SO, SI) are transmitted between CPU 100 and IFIC 101, while the clock signal (CK-4μ), preset signal (PRESET), latch signal (LATCH) and latch enable signal (LATCHEN) are produced within IFIC 101. Since the clock signal (CK-4μ) is a pulse train which has a very short cycle period (very high frequency), only the leading edges of necessary pulses are depicted by arrows and other pulses are omitted from illustration. The serial data communication is initiated at time T1 when the data strobe signal rises. Then, at time T2, i.e., at time of the first leading edge of clock signal CK-4μ, the preset signal from AND gate 254 of preset & latch signal generating circuit 251 is raised to "H" level. As a result, clock counter 245 is reset, thus causing the latch enable signal output from AND gate 244 to go to "L" level. By the leading edge of the preset signal, parallel data is preset from input buffer circuit 203 to shift register 271. At a time of the next leading edge of clock signal CK-4μ, i.e., at time T3, the preset signal goes to "L" level. At time T4, CPU 100 transmits the leading bit (MSB in this example) of transmission data on signal line SO.

At time T5, CPU 100 raises signal line SCLK to "H" level to transmit the system clock. As a result, IFIC 101 reads transmission data (MSB) into first-stage D type flip-flop 272 of shift register 271. At the same time, shift register 271 outputs the leading bit (MSB) of data, which was preset at time T2, from final stage D type flip-flop 279 of shift register 271 and transmits it to CPU 100 over signal line SI. At time T6, T8, T10, T12, T14, T16, and T18, then, CPU 100 sends data bits up to LSB serially on signal line SO and lowers signal line SCLK to "L" level. At time T7, T9, T11, T13, T15, T17, and T19, CPU 100 raises signal line SCLK to "H" level to transmit the system clock. As a result, IFIC 101 loads data bits from MSB to LSB serially into shift register 271. At the same time, shift register 271 transmits data bits from MSB to LSB, which has been preset, serially to CPU 100 over signal line SI. At time T19, the serial data communication between CPU 100 and IFIC 101 terminates.

At time T20, then, CPU 100 lowers signal line SCLK to "L" level. At this point, if the serial communication is carried out properly, the latch enable signal output from AND gate 244 will go to "H" level. At time T21, CPU 100 lowers signal line DATAST. In IFIC 101, at a time of the next leading edge of clock signal CK-4μ, i.e., at time T22, the latch signal from preset & latch signa generator 251 goes to "H" level. At this time, since the latch enable signal is at "H" level, when communication line A/B̄ is at "H" level, latch enable circuit 237 outputs the latch-A signal to latch circuit 256. As a consequence, the parallel output of shift register 271 is latched in the A channel latch of latch circuit 256. When communication line A/B̄ is at "L" level, the parallel output of shift register 271 is latched in the B channel latch of latch circuit 256. When the latch enable signal is at "L" level, latch enable circuit 237 considers that communication errors have occurred. In this case, latch enable circuit 237 transmits an error detect signal, which is at "H" level, to CPU 100 over signal line CERROR so as to inform it of the communication error, instead of providing the latch-A signal or latch-B signal to latch circuit 256.

Figure 16A:
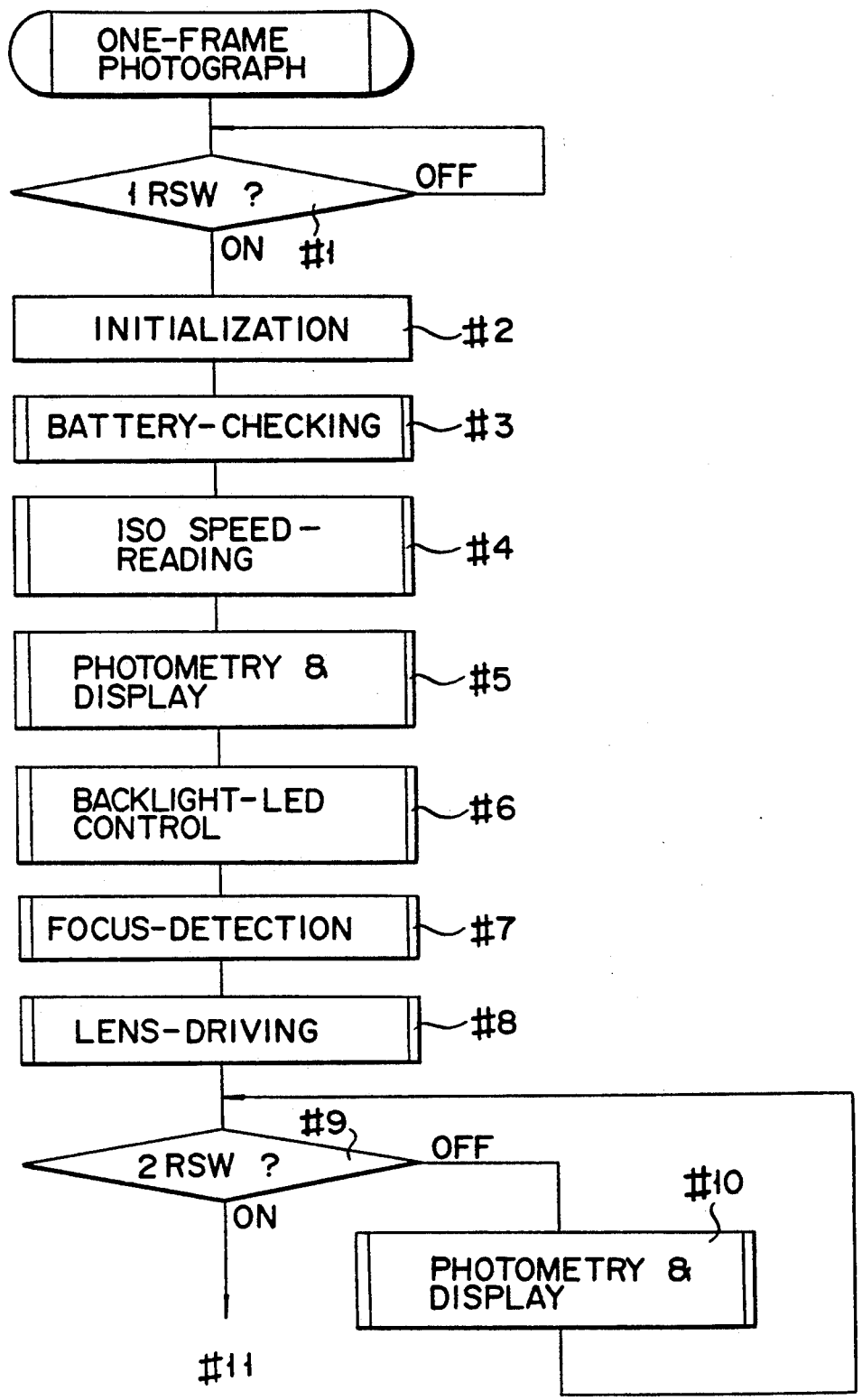
FIGS. 16A and 16B illustrate the sequence of one-frame photographing.
Figure 16B:
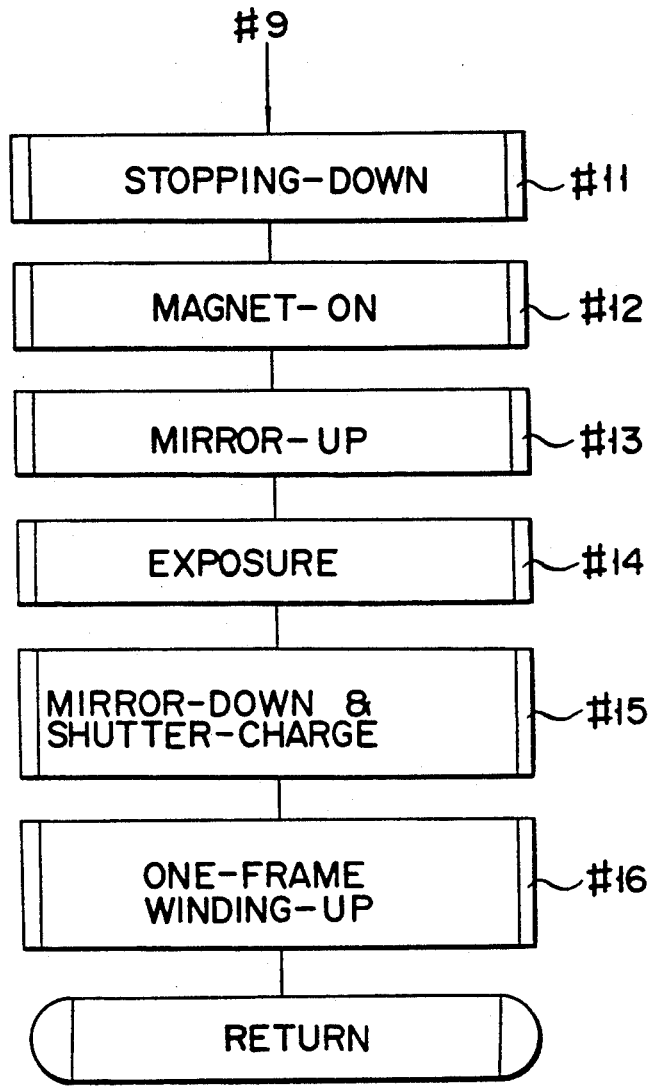

Next, the operation of the second embodiment will be described with reference to flowcharts of FIGS. 16 to 27. The one-frame photograph sequence, which is typical of camera sequence, is illustrated in FIGS. 16A and 16B. In step #1, it is detected whether or not first release switch 21 is turned on by a first stroke of the release button. When first release switch 21 is turned on, initialization is carried out in step #2. For example, flag registers and I/0 ports within CPU 100 are initialized. In step #3, the subroutine "battery-checking" is executed.

Figure 17:
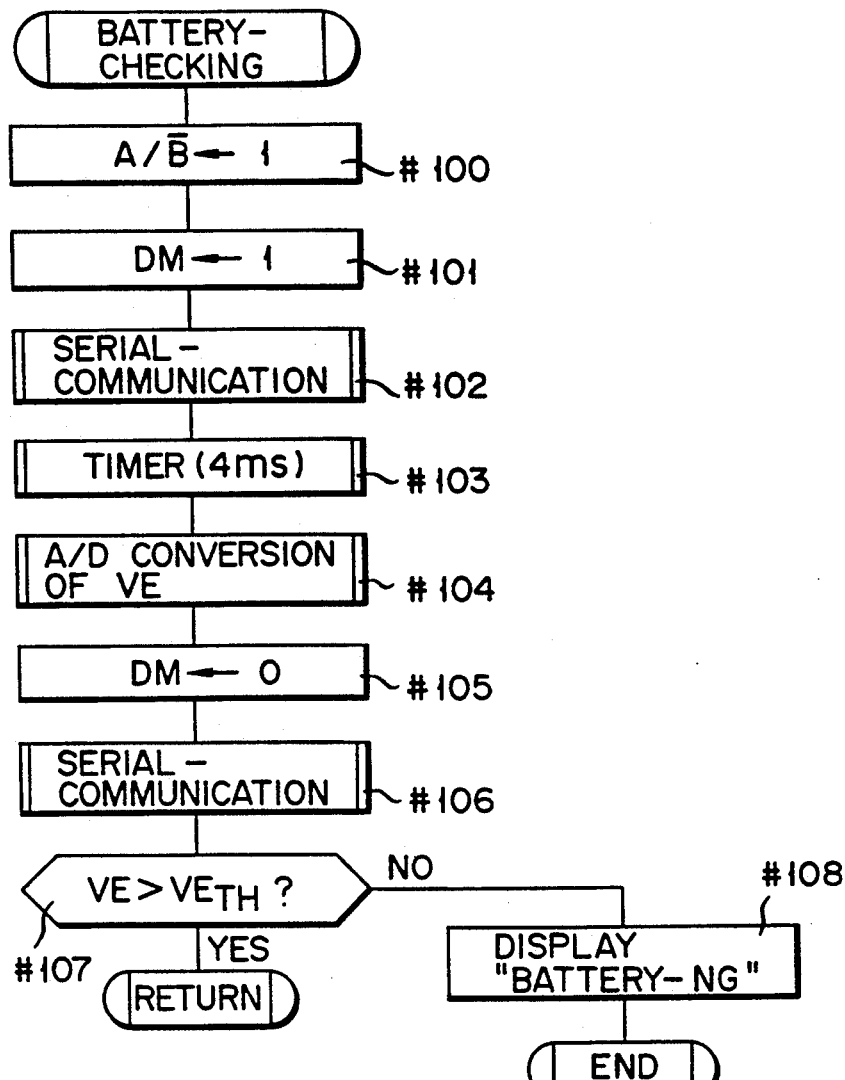
FIG. 17 is a flowchart of the subroutine "battery-checking" of FIG. 16A.

Referring to FIG. 17, there is illustrated a flowchart of the subroutine "battery-checking". In step #100 of this subroutine, communication line A/B̄ is raised to "H" level. In step #101, flag DM is set to "H" level. Flag DM corresponds to the data bit (LSB in A channel) for dummy load control shown in FIG. 13. In step #102, the subroutine "serial-communication" is executed with the flag DM set, so that the dummy load is put into operation. Designated addresses on the RAM in CPU 100 are allocated control bits, that is, flags corresponding to DM, FM0, FM1, AM0, AM1, MM0, MMI, MGF, MGS, BL, SL, AL, X and PL shown in FIG. 13. During a serial communication, parity bits are automatically added to those flags and set in a buffer memory for serial communication. As a result, the contents of the flags are transmitted to IFIC 101 as serial data. In the subroutine "battery-checking", only the flag DM is set, while the other flags remain reset. Accordingly, as a result of serial communication, only the dummy load is put into operation.

In step #103, the 4-msec timer is put to work. In step #104, battery voltage VE is subjected to A-D conversion. Thus CPU 100 can detect the battery voltage under a load. The timer provides a waiting time until the battery voltage is stabilized. In step #105, the flag DM is reset (to "L" level) and then, in step #106, the serial communication is performed. As a result, the dummy load stops its operation. In step #107, the battery voltage VE is detected, and when VE is not higher than $VE_{th}$ which is the threshold for battery checking, the display segment "BATTERY NG" is lit to terminate the one-frame photograph sequence in step #108. That is, when $VE \leq VE_{th}$, the enters the locked state. When $VE \geq VE_{th}$, on the other hand, the operation returns to the original routine (one-frame photograph sequence).

Figure 18:
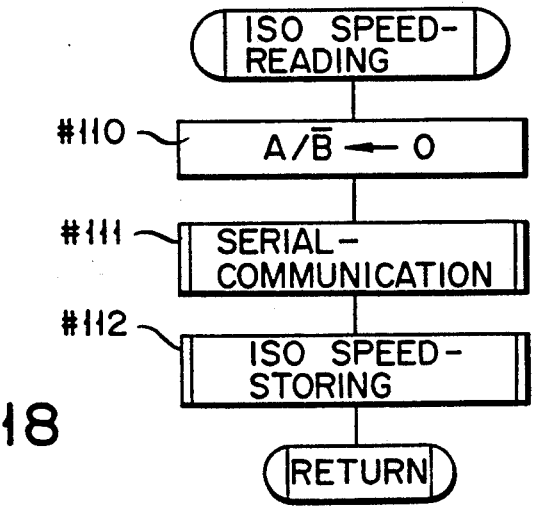
FIG. 18 is a flowchart of the subroutine "ISO speed-reading" of FIG. 16A.

After the battery checking is performed well in the one-frame photograph sequence, the subroutine "ISO speed-reading" is carried out. A flowchart of the subroutine "ISO speed-reading" is illustrated in FIG. 18. In this subroutine, the communication line A/B̄ is set to "L" level in step #110, and the subroutine "serialcommunication" is carried out in step #111. As a result, information from input terminals I13 to I18, i.e., the film ISO speed information D2 to D7 from DX2 to DX7 contacts is transmitted in serial manner to CPU 100 and stores into its buffer memory. In step #112, the ISO speed information stored into the buffer memory is stored in a specified address in a RAM. The operation then returns to the original routine.

In the one-frame photograph sequence, the subroutine "photometry & display" is carried out in step #5. FIG. 19 is a flowchart of the subroutine "photometry & display". The subroutine "photometry" is first carried out in step #120. The photometry is carried out by entering information obtained from a photometry circuit (not shown) built in the finder optics into CPU 100. The information represents a brightness value BV of an object. APEX-calculation is performed in step #121. In this calculation step, the APEX-value for lens opening, i.e., the aperture value AV and the APEX-value for the shutter time, i.e., the time value TV are calculated from the BV obtained in step #120 and the ISO speed value SV obtained in step #4 in accordance with predetermined programmed operations. In step #122, the lens opening value and shutter time corresponding to the AV and TV obtained in step #121 are displayed on LCD panel 23. Subsequently, the operation returns to the original routine.

In the one-frame photograph sequence, the subroutine "backlight-LED control" is carried out in step #6. A flowchart of the subroutine "backlight-LED control" is illustrated in FIG. 20. In this sub-routine, a comparison is first made between the BV obtained in step #120 and a constant threshold value $BV_{th}$ in step #130. When $BV \geq BV_{th}$, that is, when it is light outside, there is no need to light the backlight LED. Thus the operation returns to the original routine. When $BV \leq BV_{th}$, on the other hand, it is so dark outside that the backlight LED needs lighting. Thus, communication line A/B̄ is set to "L" level in step #131 and then the flag BL is set in step #132. The subroutine "serial-communication" is carried out in step #133. As a result, the backlight LED enters the lighting state. The operation then returns to the original routine.

Figure 21:
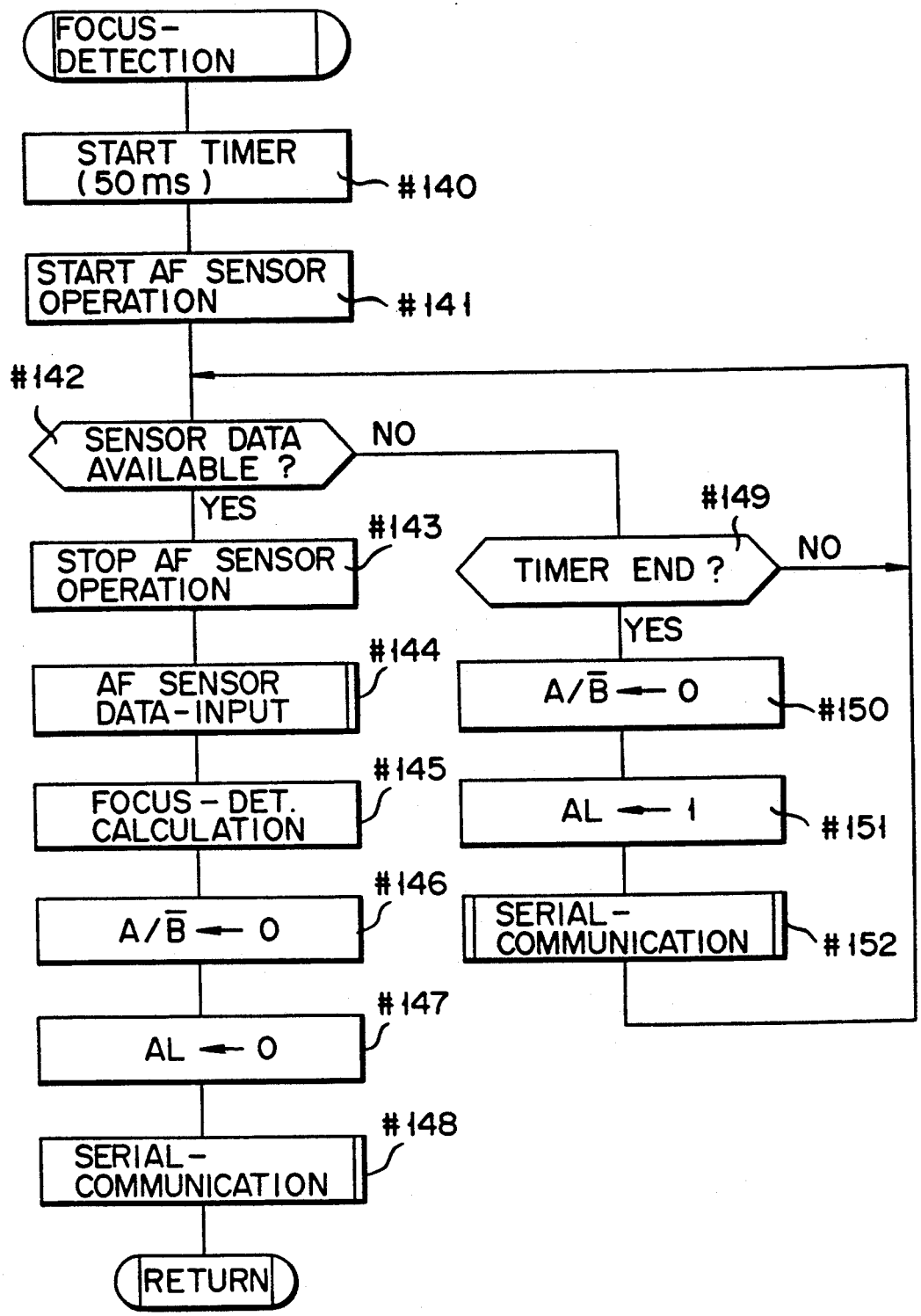
FIG. 21 is a flowchart of the subroutine "focus-detection" of FIG. 16A.

In the one-frame photograph sequence, the subroutine "focus-detection" is carried out in step #7. FIG. 21 is a flowchart of the subroutine "focus-detection". In this subroutine, the 50-msec timer is initially put to work in step #140. The AF sensor starts integration in step #141. Though not shown, an integration type of AF sensor is used in the present embodiment. The AF sensor is put to work in step #141. In step 142, it is detected whether the integration level of the AF sensor has arrived at a proper level or not. An integration control circuit is built in the AF sensor to always monitor the integration level of the sensor so as to provide an integration completion signal to CPU 100 when the proper integration level is reached. In step #142, CPU 100 monitors the presence or absence of the input signal from the integration control circuit. When the integration completion signal is absent, that is, when the proper integration level is not reached yet, the operation proceeds to step #149.

In step #149, it is detected whether timer runout has occurred or not. With no timer runout, the operation returns to step #142. The timer runout at this point means that an object is in the dark. Therefore the AF auxiliary LED 26 is lit in accordance with the following procedure. In step #150, communication line A/B̄ is set to "L" level, and in step #151 the flag AL is set. In subsequent step #152, the subroutine "serial-communication" is carried out. As a result, AF auxiliary LED 26 is lit. Subsequently the operation returns to step #142.

When the proper integration level is reached in step #142, the integration by the AF sensor is stopped in step #143. In step #144, CPU 100 receives pixel data from the AF sensor by use of a dedicated data line therebetween. In step #145, the distance to the object is calculated. As a result, the amount and direction of defocussing of the photographing lens are detected. The communication line A/B̄ is set to "L" level in step #146. The flag AL is reset in step #147. In subsequent step #148, the subroutine "serial-communication" is carried out. Consequently AF auxiliary LED 26 is turned off. Subsequently the operation returns to the original routine.

Figure 22:
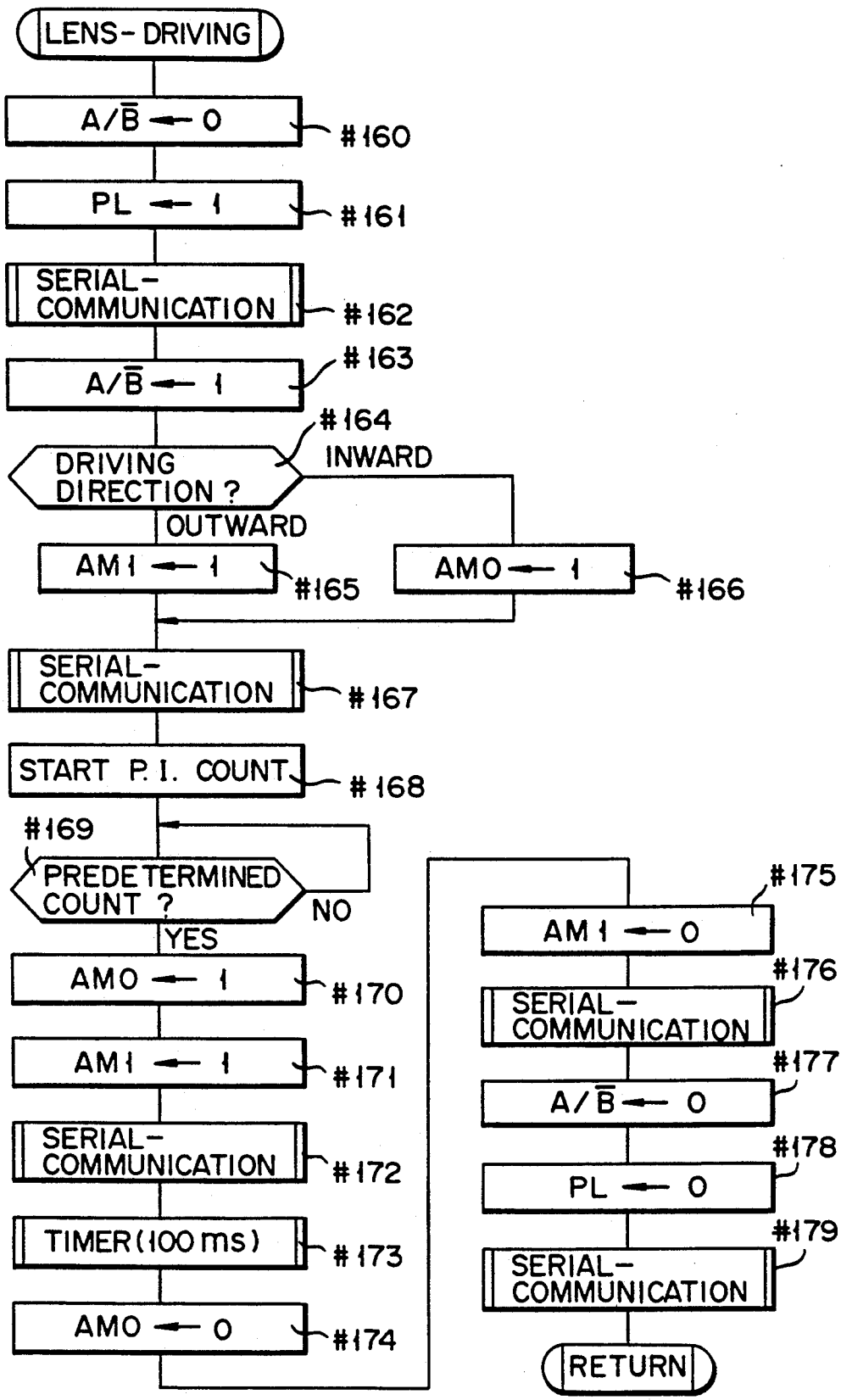
FIG. 22 is a flowchart of the subroutine "lens-driving" of FIG. 16A.

In the one-frame photograph sequence, the subroutine "lens-driving" is carried out in step #8. A flowchart of the subroutine "lens-driving" is illustrated in FIG. 22. In this subroutine, communication line A/B̄ is set to "L" level in step #160. The flag PL is set in step #161. The subroutine "serialcommunication" is carried out in step #162. As a result, the LED in photo-interrupter 48 for monitoring the amount by which the lens is to be driven is lit. In step #163, communication line A/B̄ is set to "H" level and in step #164 it is detected in which direction the lens should be moved. This decision is made on the basis of the direction of defocusing which has been obtained in step #145 in the subroutine "focus-detection" described above. When the lens is to be moved outward, the flag AM1 is set in step #165. When the lens is moved inward, on the other hand, the flag AM0 is set in step #166. The subroutine "serial-communication" is subsequently carried out in step #167. As a result, AF motor 45 starts forward or reverse rotation so that the photographing lens is moved outward or inward.

In step #168, counting of pulses produced by photo-interrupter (P.I.) 48 is started. In step #169, it is detected whether the count of pulses from the photo-interrupter arrives at a predetermined number or not. When the predetermined number is not reached, the detection in step #169 is repeated. When the predetermined number is reached, on the other hand, the flag AM0 is set in step #170, the flag AM1 is set in step #171, and the subroutine "serial-communication" is performed in step #172. As a result, AF motor 45 enters the short brake state.

After a delay of 100 msec provided in step #173, the flag AM0 is reset in step #174, the flag AM1 is reset in step #175, and the subroutine "serial-communication" is carried out in step #176. As a result, AF motor 45 is turned off. The communication line A/B* is set to "L" level in step #177, the flag PL is reset in step #178, and the subroutine "serial-communication" is carried out in step #179. As a result, the LED of photo-interrupter 48 is turned off. Subsequently the operation returns to the original routine.

In the one-frame photograph sequence, it is detected whether second release switch 22 is on or off in step #9. When the second release switch is off, the operation proceeds to step #10 so that the subroutine "photometry & display" (FIG. 19) is carried out. The operation returns to step #9 afterward. A loop of steps #9 and #10 is executed to wait for release button 20 to enter the second stroke state. The subroutine "photometry & display" is executed regularly.

Figure 23:
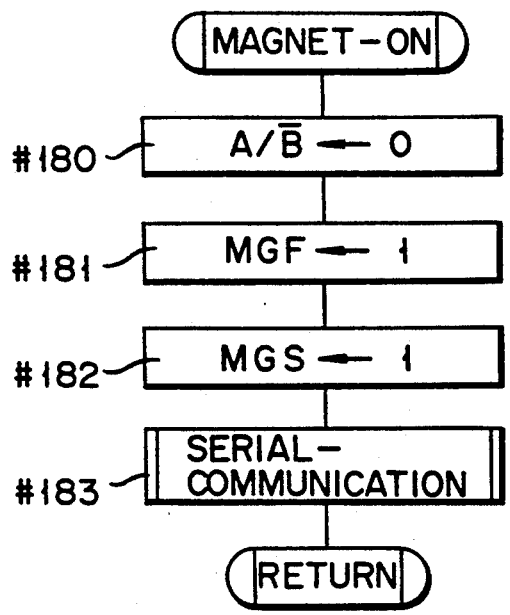
FIG. 23 is a flowchart of the subroutine "magnet-on" of FIG. 16B.

When second release switch 22 is on in step #9, the operation proceeds to step #11 in which the subroutine "stopping-down of lens" is executed. In the present embodiment, an actuator and a control circuit for stopping down are built in the photographing lens system. In step #12, the subroutine "magnet-on" is executed. FIG. 23 is a flowchart of the subroutine "magnet-on". Communication line A/B̄ is set to "L" level in step #180, the flag MGF is set in step #181, the flag MgS is set in step #182, and the subroutine "serial-communication" is executed in step #183. As a result, magnets 42 and 43 attract the first and second shutter curtains.

Figure 24:
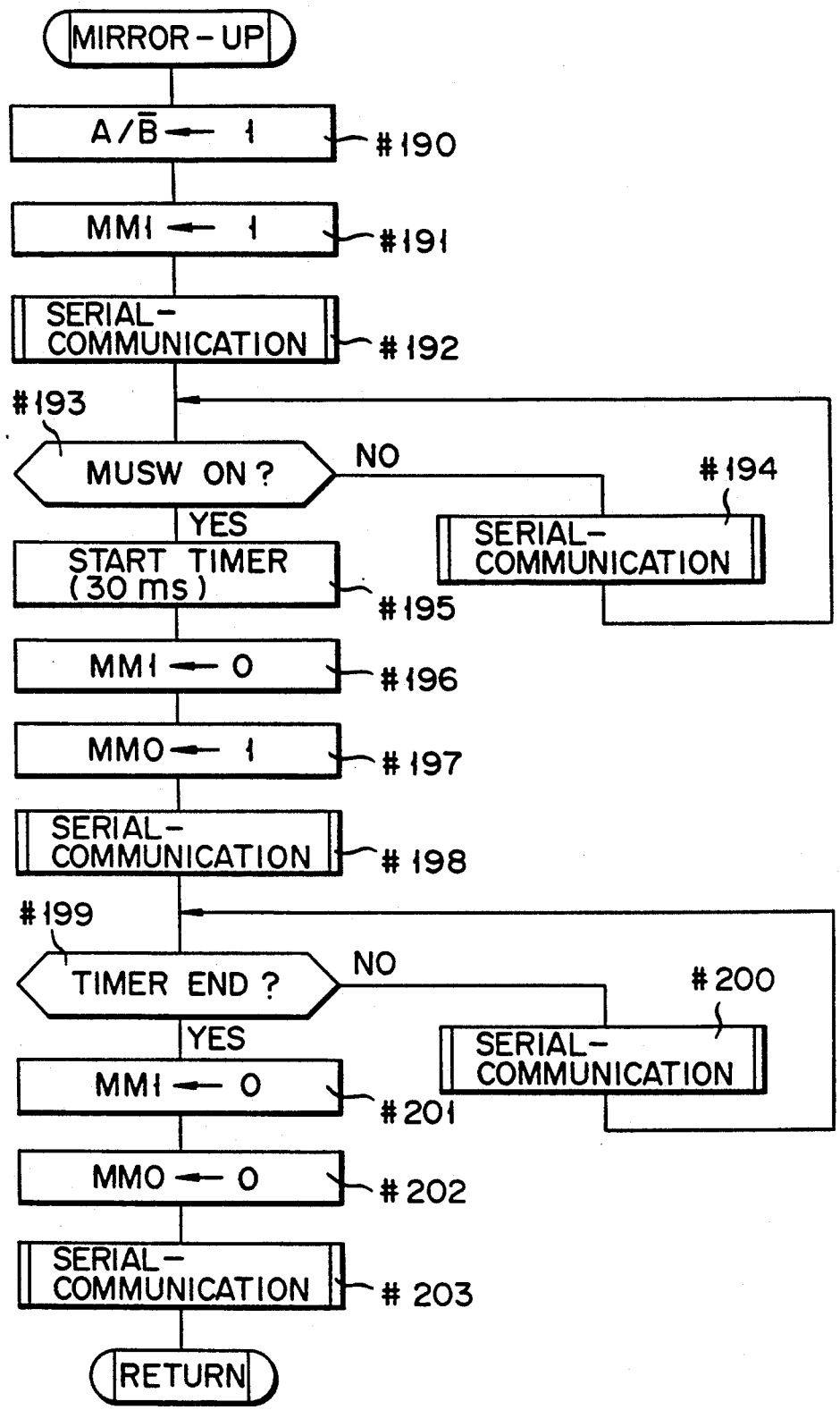
FIG. 24 is a flowchart of the subroutine "mirror-up" of FIG. 16B.

In the one-frame photograph sequence, the subroutine "mirror-up" is executed in step #13. A flowchart of the subroutine "mirror-up" is illustrated in FIG. 24. Communication line A/B̄ is raised to "H" level in step #190, the flag MM1 is set in step #191, and the subroutine "serial-communication" is executed in step #192. As a result, mirror shutter motor 38 is driven to start the mirror-up operation. In step #193, the state of mirror-up switch (MUSW) 40 is detected. The state of mirror-up switch 40 has been read into CPU 100 as a result of the serial communication in step #192. When the mirror-up switch is not on in step #193, the subroutine "serial-communication" is executed in step #194 and the operation returns to step #193. That is, when mirror-up switch 40 is not on, the serial communication is executed periodically so that setting of the state of mirror shutter motor 38 and entering the state of mirror-up switch 40 are carried out periodically.

When mirror-up switch 40 is on in step #193, 30-msec timer is put to work in step #195. The flag MM1 is reset in step #196, the flag MM0 is set in step #197, and the subroutine "serial-communication" is executed in step #198. Consequently mirror shutter motor 30 enters the short brake state. In step #199, it is detected whether 30-msec timer runout has occurred or not. If NO in step #199, the operation proceeds to step #200 in which the subroutine "serial-communication" is carried out. Subsequently the operation returns to step #199. If the timer runout has occurred in step #199, then the flag MM1 is reset in step #201, the flag MM0 is reset in step #202, and the subroutine "serialcommunication" is carried out in step #203. As a result, mirror shutter motor 38 is turned off. The 30-msec timer is to secure enough time for short brake. It is to be noted that the serial communication is periodically carried out while mirror shutter motor 38 is being driven and the short brake is being applied in the course of the subroutine. This is intended to control circuit malfunctions to the minimum by always refreshing the state of latch circuit 256 within IFIC 101 as well as to monitor the state of the switch periodically.

In the present embodiment, IFIC 101 incorporates a communication error detecting circuit such as clock counter 245 or parity checker & generating circuit 241. Thus, even if communication errors have occurred, there is little possibility that erroneous data is latched by latch circuit 256. In addition, if the erroneous data should be latched, if the serial communication is executed at intervals of a period shorter than the time constant of the mechanism including the actuator, no malfunction will occur practically.

Figure 25:
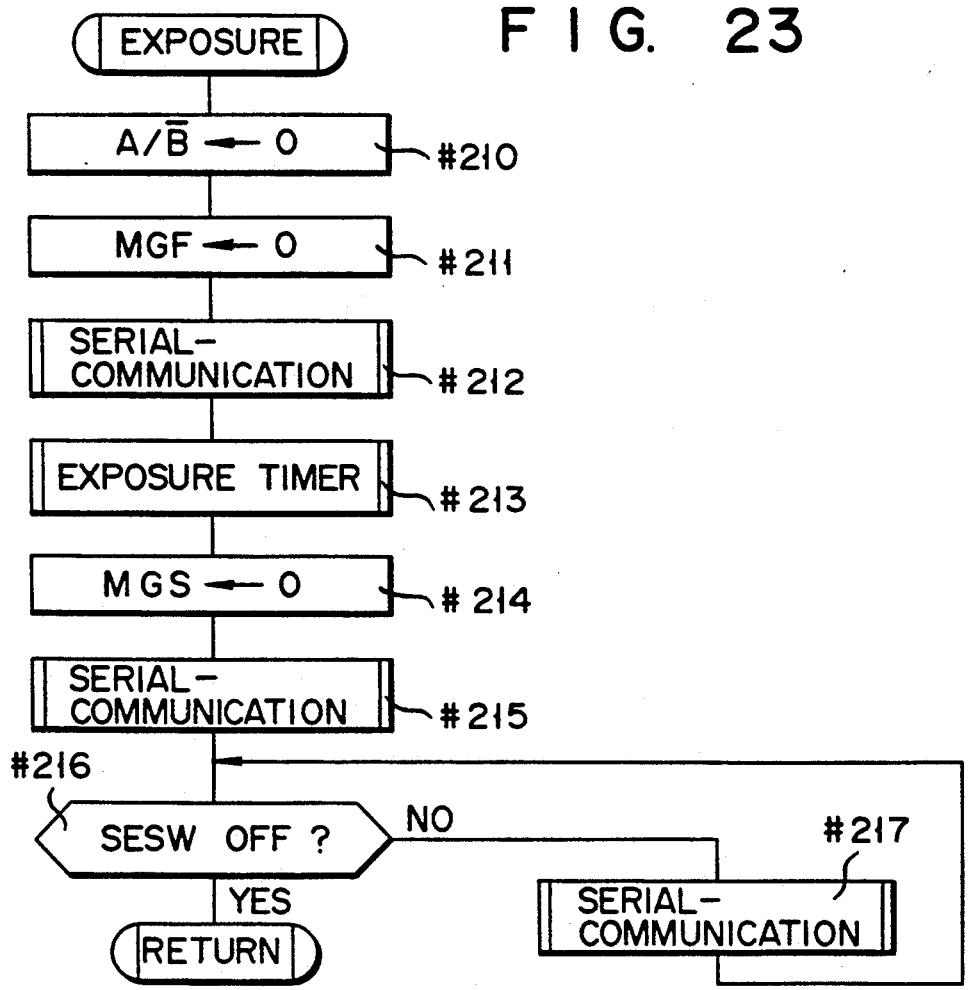
FIG. 25 is a flowchart of the subroutine "exposure" of FIG. 16B.

In the one-frame photograph sequence, the subroutine "exposure" is executed in step #14 after the subroutine "mirror-up" is terminated. A flowchart of the subroutine "exposure" is illustrated in FIG. 25. In step #210, communication line A/B̄ is set to "L" level. In step #211, the flag MGF is reset. In step #212, the subroutine "serial-communication" is carried out. As a result, first-shutter curtain arresting magnet 42 is deenergized so that the first shutter curtain starts to run. In step #213, subroutine "exposure timer" is executed so as to put the exposure timer to work. The exposure timer value is determined in accordance with the TV obtained by the APEX-calculation in step #121. After the exposure timer runout, the flag MGS is reset in step #214 and the subroutine "serial-communication" is carried out in step #215. As a result, secondshutter curtain arresting magnet 43 is deenergized so that the second shutter curtain starts to run. The exposure timer value corresponds to the shutter speed value. In step #216, the state of second-magnet termination switch (SESW) 44 is detected. The state of second-magnet termination switch 44 has been entered into CPU by the serial communication carried out in step #215. When second-magnet termination switch 44 is not off, the subroutine "serial-communication" is executed in step #217. Subsequently the operation returns to step #216. When second-magnet termination switch 44 is off in step #216, the operation returns to the original routine.

Figure 26:
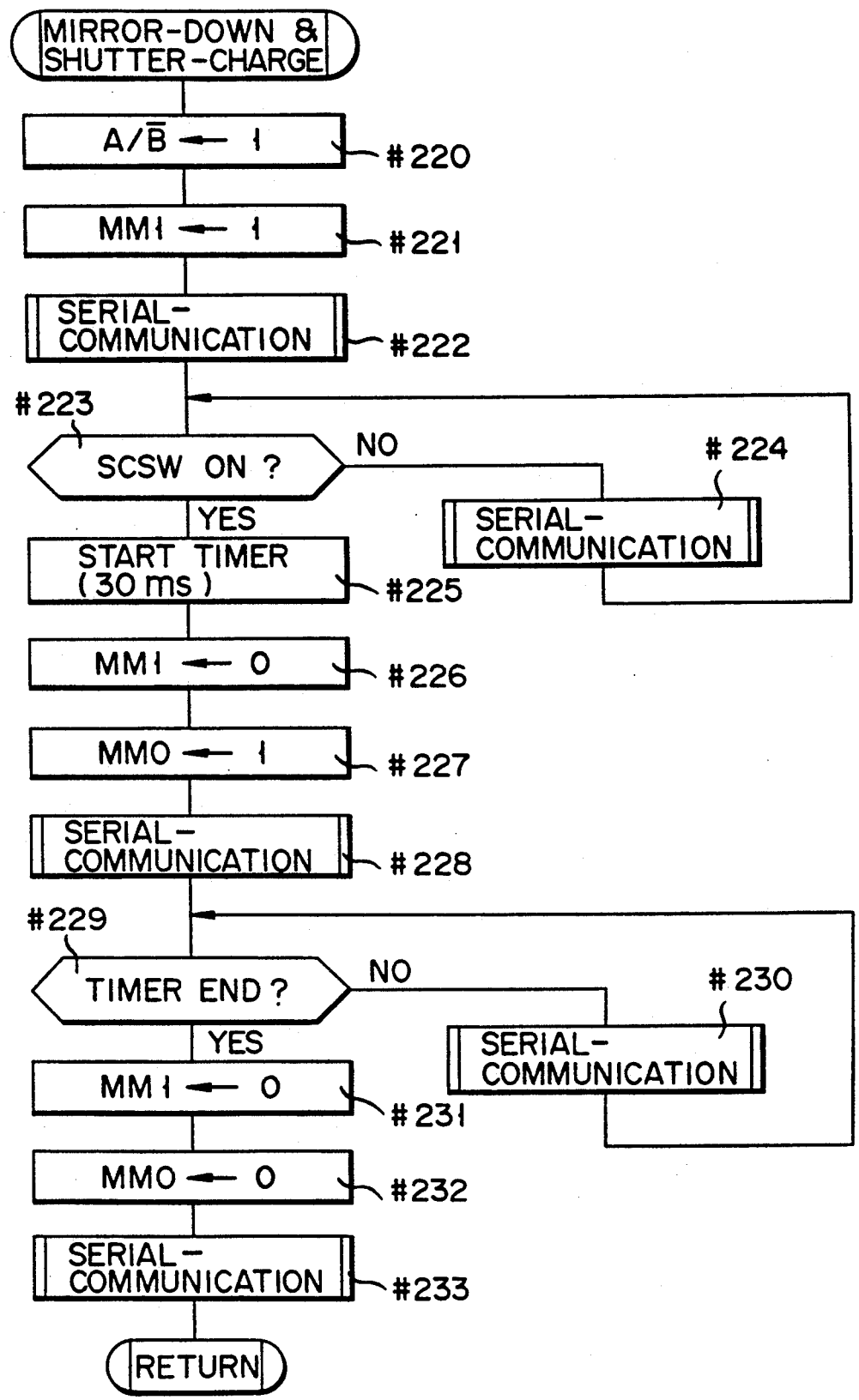
FIG. 26 is a flowchart of the subroutine "mirror-down & shutter-charge" of FIG. 16B.

In the one-frame photograph sequence, the sub-routine "mirror-down & shutter-charge" is executed in step #15. A flowchart of the subroutine "mirror-down & shutter charge" is illustrated in FIG. 26. With the subroutine, communication line A/B̄ is set to "H" level in step #220, the flag MM1 is set in step #221, and then the subroutine "serial-communication" is executed in step #222. As a result, mirror shutter motor 38 starts to be driven. In step #223, the state of shutter charging switch (SCSW) 41 is detected. The state of shutter charging switch 41 has been entered into CPU 100 by the subroutine "serial-communication" executed in step #222. The serial communication is carried out at regular intervals in this case as well. When shutter charging switch 41 is not on, a loop of steps #223 and #224 is repeated at regular intervals. When shutter charging switch 41 is on in step #223, the operation proceeds to step #225. A sequence of steps #225 to #230 is adapted to apply the short brake to mirror shutter motor 38 for 30 msec. As a result of a sequence of steps #231 to #233, mirror shutter motor 38 is turned off. Subsequently the operation returns to the original routine.

Figure 27:
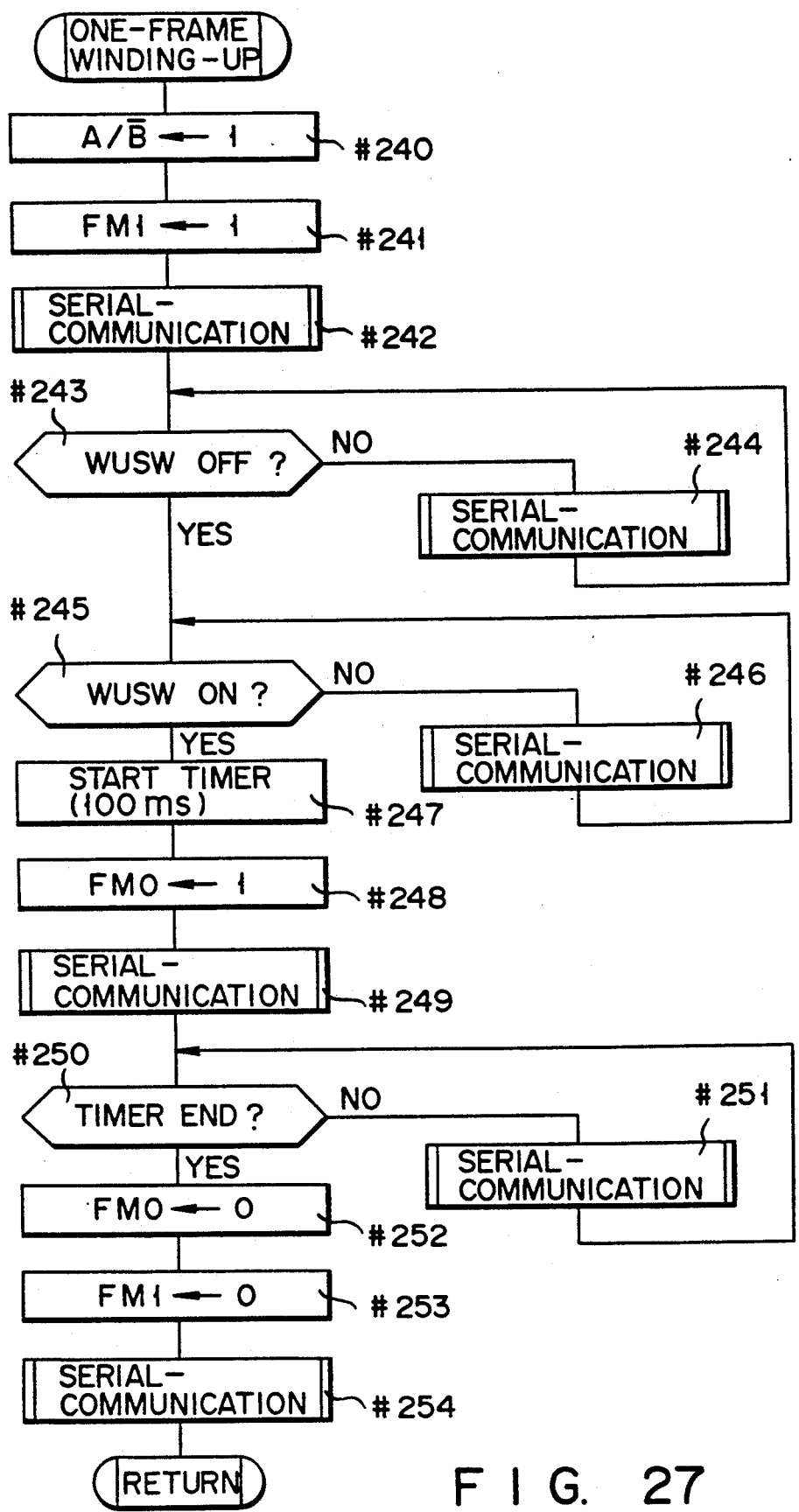
FIG. 27 is a flowchart of the subroutine "one-frame winding-up" of FIG. 16B.

In the one-frame photograph sequence, the subroutine "one-frame winding-up" is executed in step #16. A flowchart of the subroutine "one-frame winding-up" is illustrated in FIG. 27. In this subroutine, communication line A/B̄ is set to "H" level in step #240, the flag FM1 is set in step #241 and then the subroutine "serial-communication" is carried out in step #242. As a result, film motor 29 rotates in the forward direction to wind up the film. In step #243, the state of winding-up switch (WUSW) 37 is detected. The state of winding-up switch 37 has been entered into CPU 100 by the serial communication carried out in step #242. A sequence of steps #243 to #246 is adapted to continue to wind up the film until winding-up switch 37 switched from on to off is again switched on. During this sequence, the serial communication is executed at regular intervals. As a result of the serial communication, the entering of the state of winding-up switch 37 into CPU 100 and resetting of film motor 29 are executed at regular intervals. When winding-up switch 37 is on in step #245, 100-msec timer is started in step #247. The flag FM0 is set in step #247 and the subroutine "serial-communication" is carried out in step #249 so that film motor 29 enters the short brake state. In step #250, it is detected whether 100-msec timer runout has occurred or not. If the timer runout has occurred in step #250, then the flag FM0 is set in step #252 and the subroutine "serial communication" is carried out in step #254 so that film motor 29 is shut off.

In the above description, it is assumed that no communication error occurs in the course of the serial communication. However, if communication errors occurred and they were detected by the communication error detecting circuit in IFIC 101, erroneous data would not be latched. An error detect signal having "H" level will be transmitted to CPU 100 over communication line CERROR. Upon detection of this signal, CPU 100 will execute the serial communication again.

According to the second embodiment, as described above, by provision of IFIC 101 between CPU 100 and controlled objects such as motor bridge transistors and connection of a serial data communication line between CPU 100 and IFIC 101, it becomes possible to control many objects with a small number of signal lines. Also, the serial data communication line system is adapted for two-way communication (transmission and reception), resulting in an advantage that many signals representing various states can be transmitted over a small number of signal lines. Furthermore, communication errors might well be produced in the course of the serial communication because of noise generated by the actuator and motors or electrostatic noise. However, the communication errors can be detected by the communication error detecting circuit in the interface IC, thus avoiding malfunctions.

The present invention is not limited to the above embodiments and various modifications are possible. For example, with the above embodiment, although the serial data transmission line SO and the serial data receiving line SI are provided separately for simultaneous transmission and reception of data, a single serial data line may be used for transmission and reception of data. In this case there is a need for a signal for switching between transmission and reception modes to be transmitted from the CPU to the IFIC. With the above embodiment, although the IFIC is adapted to control a plurality of objects using the serial data communication lines and enter signals representing the states of switches and the like into the CPU, the IFIC may be used only for controlling the controlled objects and the state representing signals may be directly entered into the CPU. In addition, with the present embodiment, communication errors are detected within the IFIC and a communication error detect signal is transmitted to the CPU. If all the data communications were carried out cyclically, the detection of communication errors would be not always necessary. This is because even if an error should occur in transmitting data, the erroneous data has only to be made invalid and retransmitted at the time when it is to be transmitted next.

According to the present invention, as described above, there is provided a camera driving circuit which avoids an increase of the number of components of a predriver for making up low current supply capability of a CPU and an increase of the number of signal lines between the CPU and predriver.

What is claimed is:

1. A device for driving a camera, comprising: a plurality of controlled objects which actuate mechanisms of the camera;
   a central processing unit ("CPU") including means for generating a serial sequence of digital data bits arranged into groups, each of said groups having a given number of said bits each of which is designated for one of said controlled objects, and means for outputting each of said groups in a data communication period;
   an interface including memory means for receiving said bits and having a plurality of memory locations at least equal in number to the number of bits in one of said groups of bits, each of said plurality of controlled objects being coupled to at least one of said memory locations, wherein said memory means stores the bits belonging to each one of said groups of bits in a predetermined manner such that, at the end of said data communication period, the received bits of one said group are all stored, respectively, in memory locations coupled to controlled objects for which such bits have been respectively designated; and
   means for simultaneously providing the bits stored in said memory means to the controlled objects to which said memory locations are respectively coupled.

2. A device according to claim 1, wherein
   said central processing unit comprises means for supplying a signal (A/$\overline{B}$) for identifying one of said groups to said interface; and
   said interface comprises means (305 to 312) for connecting one of said plurality of objects which is identified by said signal and one of said memory locations which is identified by said signal to each other.

3. A device according to claim 1, wherein said controlled objects include detectors (37 to 44, 120 to 126) which respectively correspond to said digital data bits, for detecting an operation status and a setting status of various parts of the camera, and outputs of the detectors are supplied to said central processing unit as said serial sequence of digital data bits.

4. A device according to claim 1, wherein said interface comprises means for detecting whether or not a communication error is included in said serial sequence of digital data bits supplied from said central processing unit.

5. A device according to claim 4, wherein said error detecting means counts clock pulses transmitted from said central processing unit, thereby detecting the communication error depending on whether the count of the clock pulses is a predetermined value or not.

6. A device according to claim 4, wherein said error detecting means performs logical operations on data transmitted, including a parity bit in order to detect the communication error.

7. A device according to claim 4, wherein when detecting the communication error, said error detecting means transmits a request to resend signal to said central processing unit to resend the data.

8. A device according to claim 4, wherein when detecting the communication error, said error detecting means prohibits said memory means from storing the serial sequence of digital data bits.

9. A device according to claim 1, wherein said controlled objects include actuators, and said CPU repeatedly performs a serial data communication when said actuators are in operation, the cycle period of the serial data communication being shorter than the time constant of said actuators.

10. A device according to claim 1, wherein said CPU supplies a communication select signal for specifying the timing of data communication to said interface, and said memory means is responsive to an edge of the communication select signal to store the serial sequence of digital data bits.

11. A device for driving a camera, comprising:
    a plurality of signal sources (37 to 44, 120 to 126) for outputting signals representing an operation status and a setting status of various parts of the camera, the signal sources being arranged into groups, each of said groups having a given number of signal sources;
    an interface (101) including means (305 to 312) for selectively receiving output signals from one of a plurality of groups of said signal sources and means (271) for generating a serial sequence of digital data bits based on the received signals, the number of said bits being equal to the number of the signals sources included in one group; and
    a central processing unit ("CPU") (100) for receiving the serial sequence of digital data bits and generating various instructions to various actuators of the camera in accordance with programmed instructions and the received signal, the CPU causing said interface to communicate with one of said groups of signal sources in accordance with the programmed instructions.

12. A device according to claim 11, wherein
    said central processing unit comprises means for supplying a signal (A/$\overline{B}$) for identifying one of said groups to said interface; and
    said interface comprises means (305 to 312) for connecting one of said plurality of signal sources which is identified by said signal and one of said memory locations which is identified by said signal to each other.

13. A device according to claim 11, wherein said signal sources include detectors (37 to 44, 120 to 126) which respectively correspond to said digital data bits, for detecting an operation status and a setting status of various parts of the camera, and outputs of the detectors are supplied to said central processing unit as said serial sequence of digital data bits.

14. A device according to claim 11, wherein said interface comprises means for detecting whether or not a communication error is included in said serial sequence of digital data bits supplied from said central processing unit.

15. A device according to claim 14, wherein said error detecting means counts clock pulses transmitted from said central processing unit, thereby detecting the communication error depending on whether the count of the clock pulses is a predetermined value or not.

16. A device according to claim 14, wherein said error detecting means performs logical operations on data transmitted, including a parity bit in order to detect the communication error.

17. A device according to claim 14, wherein when detecting the communication error, said error detecting means transmits a request to resend signal to said central processing unit to resend the data.

18. A device according to claim 14, wherein when detecting the communication error, said error detecting means prohibits said memory means from storing the serial sequence of digital data bits.

19. A device according to claim 11, wherein said signal sources include actuators, and said CPU repeatedly performs a serial data communication when said actuators are in operation, the cycle period of the serial data communication being shorter than the time constant of said actuators.

20. A device according to claim 11, wherein said CPU supplied a communication select signal for specifying the timing of data communication to said interface, and said memory means is responsive to an edge of the communication select signal to store the serial sequence of digital data bits.

21. A device for driving a camera, comprising:
a plurality of controlled objects which actuate mechanisms of the camera;
a central processing unit ("CPU") including means for generating a serial sequence of digital data bits of a predetermined number, each of said bits being designated for one of said controlled objects, and means for outputting each of said groups in a data communication period;
an interface, including memory means for receiving said bits and having a plurality of memory locations at least equal in number to the number of bits of said serial sequence of digital data bits, each of said plurality of controlled objects being coupled to at least one of said memory locations, wherein said memory means stored the bits of the serial sequence of digital bits in a predetermined manner such that, at the end of said data communication period, the received bits of the serial sequence of digital bits are all stored, respectively, in memory locations coupled to controlled objects for which such bits have been respectively designated; and
means for simultaneously supplying the bits stored in said memory means to the coupled objects to which said memory locations are respectively coupled.

22. A device for driving a camera, comprising:
a plurality of signal sources (37 to 44, 120 to 126) for outputting signals representing an operation status and a setting status of various parts of the camera;
an interface (101) including means (305 to 312) for receiving output signals from said signal sources and means (271) for generating a serial sequence of digital data bits based on the received signals, the number of said bits being equal to the number of the signal sources; and
a central processing unit ("CPU") (100) for receiving the serial sequence of digital data bits and generating various instructions to various actuators of the camera in accordance with programmed instructions and the received signal.

23. A device for driving a camera, comprising: a plurality of controlled objects which actuate mechanisms of the camera;
a central processing unit ("CPU") including means for generating digital data bits arranged into groups, each of said groups having a given number of said bits each of which is designated for one of said controlled objects, and means for outputting each of said groups in a data communication period;
an interface including memory means for receiving said bits and having a plurality of memory locations at least equal in number to the number of bits in one of said groups of bits, each of said plurality of controlled objects being coupled to at least one of said memory locations, wherein said memory means stores the bits belonging to each one of said groups of bits in a predetermined manner such that, at the end of said data communication period, the received bits of one said group are all stored, respectively, in memory locations coupled to controlled objects for which such bits have been respectively designated; and
means for simultaneously providing the bits stored in said memory means to the controlled objects to which said memory locations are respectively coupled.

24. A device for driving a camera, comprising:
a plurality of signal sources (37 to 44, 120 to 126) for outputting signals representing an operation status and a setting status of various parts of the camera, the signal sources being arranged into groups, each of said groups having a given number of signal sources;
an interface (101) including means (305 to 312) for selectively receiving output signals from one of a plurality of groups of said signal sources and means (271) for generating digital data bits based on the received signals, the number of said bits being equal to the number of the signal sources included in one group; and
a central processing unit ("CPU") (100) for receiving the serial sequence of digital data bits and generating various instructions to various actuators of the camera in accordance with programmed instructions and the received signal, the CPU causing said interface to communicate with one of said groups of signal sources in accordance with the programmed instructions.

25. A device for driving a camera, comprising:
a plurality of controlled objects which actuate mechanisms of the camera;
a central processing unit including means for generating a serial sequence of digital data bits arranged into groups (A, B), means for generating an identification signal (A/B) for identifying one of said groups, and means for outputting each of said groups in a data communication period;
an interface including means for receiving said group of the serial sequence of the digital data bits and said identification signal and memory means for storing said group into a memory location according to the identification signal, which is connected to a specified controlled object at the end of said data communication period; and
means for simultaneously supplying the bits of the groups stored in said memory means to the controlled objects to which said memory locations are respectively coupled.

* * * * *